US010913496B2

(12) United States Patent
Yamashita et al.

(10) Patent No.: US 10,913,496 B2
(45) Date of Patent: Feb. 9, 2021

(54) PARKING ASSISTANCE DEVICE

(71) Applicants: AISIN SEIKI KABUSHIKI KAISHA, Kariya (JP); TOYOTA JIDOSHA KABUSHIKI KAISHA, Toyota (JP); DENSO CORPORATION, Kariya (JP)

(72) Inventors: Tomohisa Yamashita, Toyohashi (JP); Masaya Kato, Toyokawa (JP); Hiroyuki Tachibana, Okazaki (JP); Hidehiko Miyoshi, Tajimi (JP); Yu Tanaka, Nagoya (JP); Takatomo Asai, Nagoya (JP); Motonari Obayashi, Nagakute (JP); Hironobu Ishijima, Toyota (JP); Keisuke Oyama, Toyota (JP); Kiyoshi Takahashi, Hekinan (JP)

(73) Assignees: AISIN SEIKI KABUSHIKI KAISHA, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 547 days.

(21) Appl. No.: 15/509,927

(22) PCT Filed: Sep. 10, 2015

(86) PCT No.: PCT/JP2015/075761

§ 371 (c)(1),
(2) Date: Mar. 9, 2017

(87) PCT Pub. No.: WO2016/039427

PCT Pub. Date: Mar. 17, 2016

(65) Prior Publication Data

US 2017/0259850 A1 Sep. 14, 2017

(30) Foreign Application Priority Data

Sep. 12, 2014 (JP) ................................ 2014-186798

(51) Int. Cl.
*B62D 15/02* (2006.01)
*B62D 6/00* (2006.01)
(Continued)

(52) U.S. Cl.
CPC ........... *B62D 15/028* (2013.01); *B60W 30/06* (2013.01); *B62D 5/0463* (2013.01); *B62D 6/00* (2013.01);
(Continued)

(58) Field of Classification Search
None
See application file for complete search history.

(56) References Cited

U.S. PATENT DOCUMENTS 8,205,704 B2 * 6/2012 Kadowaki .......... B62D 15/0285 180/199
8,599,043 B2 * 12/2013 Kadowaki ............ B62D 15/027 180/199
(Continued)

FOREIGN PATENT DOCUMENTS

CN 102333681 A 1/2012
JP 2007-76496 A 3/2007
(Continued)

OTHER PUBLICATIONS

Notification of Reason for Refusal for corresponding JP 2014-186798, dated May 20, 2016.
(Continued)

*Primary Examiner* — Navid Ziaeianmehdizadeh
(74) *Attorney, Agent, or Firm* — Sughrue Mion, PLLC

(57) ABSTRACT

A parking assistance device includes a detection unit that detects a parkable area in a surrounding area of a vehicle, a route calculation unit that calculates a parking guidance route for guiding the vehicle from the current position of the vehicle to a parking target position contained in the parkable
(Continued)

area, and a control unit that guides the vehicle to the parking target position according to the parking guidance route, completes the guidance when the vehicle has fit into the parkable area with a certain attitude and has reached the parking target position, and varies a completion extension period until the guidance of the vehicle is completed according to the stop mode of the vehicle when the vehicle has entered the parkable area with the certain attitude and the vehicle has stopped before reaching the parking target position.

5 Claims, 14 Drawing Sheets

(51) Int. Cl.
*B60W 30/06* (2006.01)
*G08G 1/16* (2006.01)
*B62D 5/04* (2006.01)

(52) U.S. Cl.
CPC ....... *B62D 15/021* (2013.01); *B62D 15/0285* (2013.01); *G08G 1/168* (2013.01)

(56) References Cited

U.S. PATENT DOCUMENTS

| | | | | |
|---|---|---|---|---|
| 2005/0027415 | A1* | 2/2005 | Iwazaki | B62D 15/0285 701/36 |
| 2009/0076673 | A1* | 3/2009 | Brabec | A01B 69/008 701/23 |
| 2010/0118140 | A1* | 5/2010 | Iwakiri | B60R 1/00 348/135 |
| 2010/0231417 | A1* | 9/2010 | Kadowaki | B62D 15/027 340/932.2 |
| 2011/0298639 | A1 | 12/2011 | Kadowaki et al. | |
| 2016/0075375 | A1* | 3/2016 | Yamashita | B62D 15/028 701/41 |

FOREIGN PATENT DOCUMENTS

| | | | |
|---|---|---|---|
| JP | 2007-161119 | A | 6/2007 |
| JP | 2013-193526 | A | 9/2013 |
| WO | 2009/063710 | A1 | 5/2009 |

OTHER PUBLICATIONS

International Search Report for PCT/JP2015/075761 dated Nov. 24, 2015.

* cited by examiner

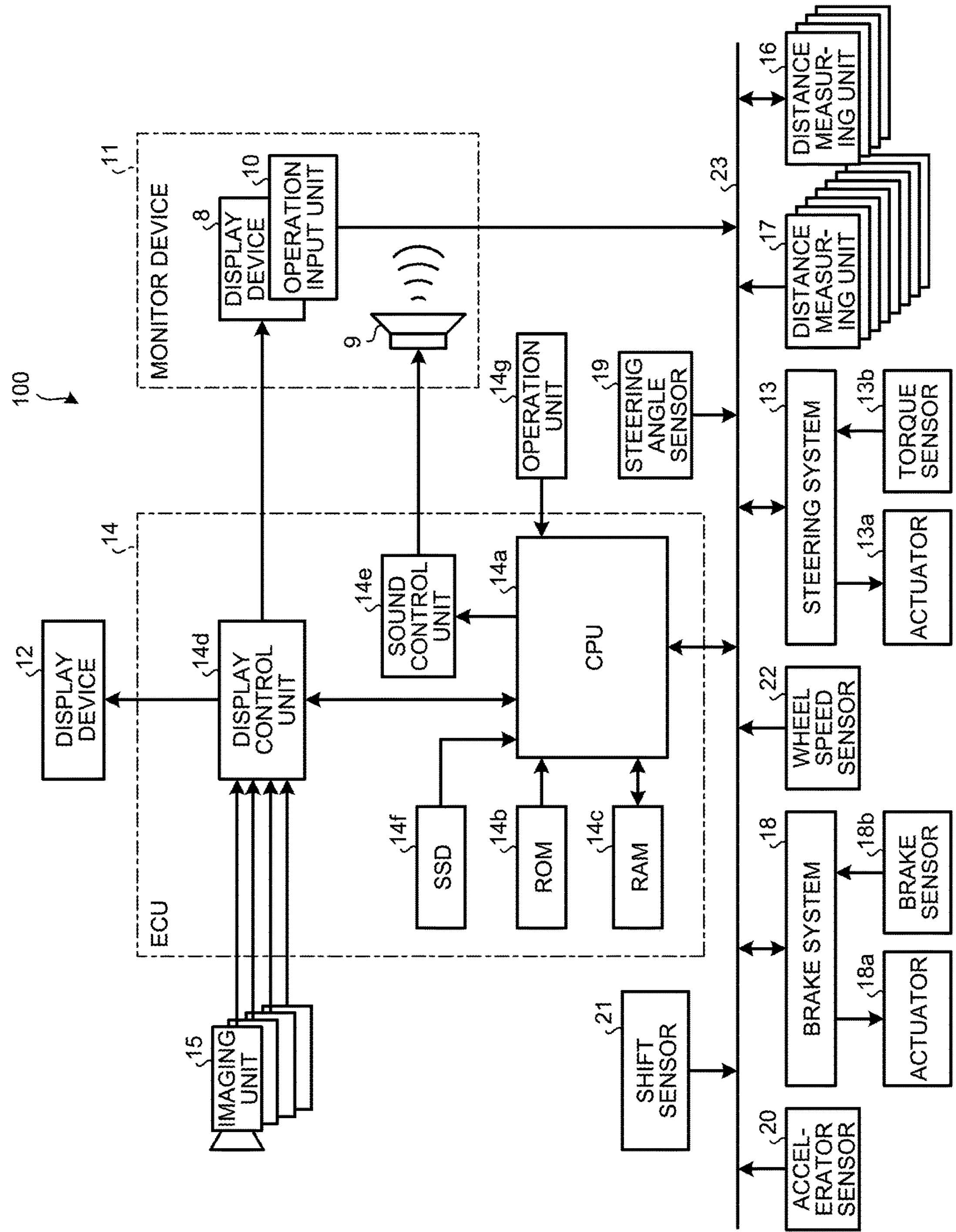
FIG.4
100
DISPLAY DEVICE
12
ECU
14
DISPLAY CONTROL UNIT
14d
SOUND CONTROL UNIT
14e
CPU
14a
SSD
14f
ROM
14b
RAM
14c
IMAGING UNIT
15
MONITOR DEVICE
11
DISPLAY DEVICE
8
OPERATION INPUT UNIT
10
9
OPERATION UNIT
14g
STEERING ANGLE SENSOR
19
SHIFT SENSOR
21
23
DISTANCE MEASUR-ING UNIT
16
DISTANCE MEASUR-ING UNIT
17
STEERING SYSTEM
13
TORQUE SENSOR
13b
ACTUATOR
13a
WHEEL SPEED SENSOR
22
BRAKE SYSTEM
18
BRAKE SENSOR
18b
ACTUATOR
18a
ACCEL-ERATOR SENSOR
20

R
62
66
64(64b)
66
74
62
66
78
L
β
α
66
76
62
66
64(64a)
66
72
70
70
62
68(1)
60

62
66
64(64b)
66
62
72 68(1)
β
66
α
60
72
L
78
66
68(1)
76
62
66
64(64a)
66
72
62
68(1)

62
66
64(64b)
66
62
72 68(1)
β
66
α
72
L
78
60
68(1)
66
76
62
66
64(64a)
66
72
62
68(1)

62
66
64(64b)
68(1)
72
L3
L2
β
α
78
60
L
L1
76
64(64a)

PARKING ASSISTANCE DEVICE

CROSS REFERENCE TO RELATED APPLICATIONS

This application is national stage application of International Application No. PCT/JP2015/075761, filed Sep. 10, 2015, which designates the United States, incorporated herein by reference, and which claims the benefit of priority from Japanese Patent Application No. 2014-186798, filed Sep. 12, 2014, the entire contents of which are incorporated herein by reference.

TECHNICAL FIELD

Embodiments of the present invention relate to a parking assistance device.

BACKGROUND ART

Conventionally, a parking assistance device has been developed that searches for a parking space in which a subject vehicle can be parked by various kinds of sensors installed in the vehicle, calculates an optimum vehicle trajectory to a parking target position set in the parking space, and guides the subject vehicle along the vehicle trajectory, thereby reducing the load of parking operation on a driver.

CITATION LIST

Patent Literature

Patent Document 1: WO 09/063710

SUMMARY OF INVENTION

Problem to be Solved by the Invention

When the subject vehicle is guided to the parking space detected by the sensors, vehicle derivation processing or guidance processing is ended when the subject vehicle has completely fit into a parking space as a target (a target parking space) in some cases. However, before the subject vehicle completely fits into the target parking space, the vehicle may stop. The travel of the vehicle may be hindered and stop by the road surface condition of the parking space, or the vehicle may be stopped midway through the guidance by the decision of a user oneself, for example. However, in such cases, the vehicle has not reached the end of a guidance route leading to a set parking target position, and the end condition of the guidance is not satisfied. Consequently, the parking assistance device may continue the guidance. In other words, even though the vehicle has stopped, the guidance is continued, which may cause the user's troublesomeness or uncomfortableness.

Means for Solving Problem

A parking assistance device of the embodiment comprises a detection unit that detects a parkable area in a surrounding area of a vehicle; a route calculation unit that calculates a parking guidance route for guiding the vehicle from a current position of the vehicle to a parking target position contained in the parkable area detected by the detection unit; and a control unit that guides the vehicle to the parking target position according to the parking guidance route calculated by the route calculation unit, completes the guidance when the vehicle has fit into the parkable area with a certain attitude and has reached the parking target position, and completes the guidance of the vehicle according to a stop mode of the vehicle when the vehicle has entered the parkable area with the certain attitude and the vehicle has stopped before reaching the parking target position. According to this aspect, even when the vehicle has stopped before reaching the parking target position, for example, the guidance of the vehicle is completed according to its stop mode. Consequently, the timing when the parking assistance is completed can be adjusted, and conventional troublesomeness and uncomfortableness can be reduced by the adjustment.

In the parking assistance device of the embodiment, the control unit varies a completion extension period according to the stop mode of the vehicle, the completion extension period being a period until the guidance of the vehicle is completed. According to this aspect, even when the vehicle has stopped before reaching the parking target position, for example, the guidance is completed after the lapse of the completion extension period corresponding to its stop mode. Consequently, the timing when the parking assistance is completed can be adjusted, and conventional troublesomeness and uncomfortableness can be reduced by the adjustment.

In the parking assistance device of the embodiment, the control unit may set length of the completion extension period longer for a second stop mode in which the stop mode of the vehicle does not involve an operation for stopping the vehicle than for a first stop mode in which the stop mode of the vehicle involves the operation for stopping the vehicle. According to this aspect, even when the vehicle has stopped before reaching the parking target position, the guidance is quickly completed in the case of a stop accompanied by the operation for stopping the vehicle, that is, a stop based on the intention of the user, and conventional troublesomeness and uncomfortableness can be reduced. In addition, in the case of a stop not accompanied by the operation for stopping the vehicle, that is, a stop not by the intention of the user, the extension period until the stop of the guidance is prolonged compared with the case of the stop based on the intention of the user, and even when the guidance stops in an unintentional situation, the user can be provided with an opportunity of a subsequent response.

In the parking assistance device of the embodiment, when completing the guidance of the vehicle, the control unit may perform a confirmation notice that confirms appropriateness of completion with a user. According to this aspect, even when the vehicle has stopped before reaching the parking target position, the user is caused to decide whether it is appropriate to complete the guidance at that moment, and the user can be convinced of the completion of the guidance, and in addition, when the user wants the resume of the guidance after the stop of the vehicle, a shift to the resume of the guidance can be quickly achieved.

In the parking assistance device of the embodiment, the control unit may determine that the certain attitude is not satisfied at least one of when the vehicle has deviated from the parking guidance route by a certain distance or more in a vehicle width direction or when a central axis in a fore-and-aft direction of the vehicle has deviated by a certain angle or more relative to a guidance direction based on the parking guidance route, when the vehicle has entered the parkable area by a certain amount, reserves the completion of guidance by the stop of the vehicle, and cause the route calculation unit to recalculate a parking guidance route so as to correct the deviation of guidance. According to this aspect, when deviation occurs in guidance, and it is difficult to guide the vehicle to the parking target position, for example, the recalculation of the parking guidance route is performed before the guidance for parking is completed, and the parking can be smoothly completed.

In the parking assistance device of the embodiment, the control unit may correct, when the route calculation unit has performed the recalculation of the parking guidance route, tolerance values of deviation of a distance in the vehicle width direction of the vehicle relative to the recalculated parking guidance route and deviation of the central axis in the fore-and-aft direction of the vehicle relative to a guidance direction. According to this aspect, when the tolerance values are corrected to a stricter side, for example, the guidance to the parking target position can be performed with high precision. In contrast, when the tolerance values are corrected to a looser side, the recalculation of the parking guidance route is prevented from being repeatedly performed, and even when the parking guidance route is recalculated, the guidance can be quickly completed.

A parking assistance device of the embodiment comprises a detection unit that detects a parkable area in a surrounding area of a vehicle; a route calculation unit that calculates a parking guidance route for guiding the vehicle from a current position of the vehicle to a parking target position contained in the parkable area detected by the detection unit; and a control unit that guides the vehicle to the parking target position according to the parking guidance route calculated by the route calculation unit, completes the guidance when the vehicle has fit into the parkable area with a certain attitude and has reached the parking target position, and completes the guidance of the vehicle when the vehicle has entered the parkable area by a certain amount of distance and the vehicle has stopped before reaching the parking target position. According to this aspect, even when the vehicle has stopped before reaching the parking target position, for example, the guidance of the vehicle is completed if the vehicle has entered the parkable area by the certain amount (of distance). In other words, the timing when the parking assistance is completed can be adjusted, and conventional troublesomeness and uncomfortableness can be reduced by the adjustment.

In the parking assistance device, after a driver has performed a braking operation before the vehicle reaches the parkable area by the certain amount of distance, the control unit may complete the guidance when the vehicle has reached an attitude satisfying a certain condition relative to the parkable area. According to this aspect, even when the vehicle has intentionally stopped by the braking operation by the driver, for example, when the attitude of the vehicle at that moment is the attitude satisfying the certain condition that is regarded as not requiring the parking assistance any more, the parking assistance can be smoothly completed.

BRIEF DESCRIPTION OF DRAWINGS

FIG. 1 is an exemplary perspective view illustrating a state in which part of a cabin of a vehicle according to an embodiment is seen through;

FIG. 4 is an exemplary block diagram illustrating a configuration of a parking assistance system according to the embodiment;

DESCRIPTION OF EMBODIMENTS

Exemplary embodiments of the present invention will be disclosed below. Configurations according to the embodiments described below, and operations, results, and effects achieved by these configurations are merely exemplary. The present invention can be achieved by any configuration other than the configurations disclosed in the embodiments below. The present invention can obtain at least one of various kinds of effects and secondary effects based on the basic configurations.

In the present embodiment, a vehicle 1 mounting a parking assistance device may be an automobile having an internal combustion engine (not illustrated) as a drive source, that is, an internal combustion engine automobile, may be an automobile having an electric motor (not illustrated) as a drive source, that is, an electric vehicle or a fuel cell electric vehicle, may be a hybrid vehicle having both of the internal combustion engine and the electric motor as drive sources, or may be an automobile having other drive sources, for example. The vehicle 1 can mount a variety of gear shifters, and can mount a variety of devices required to drive an internal combustion engine and an electric motor, such as systems and components. The style, number, layout, and the like of equipment involved in driving wheels 3 of the vehicle 1 can be set in various ways.

Figure 1:
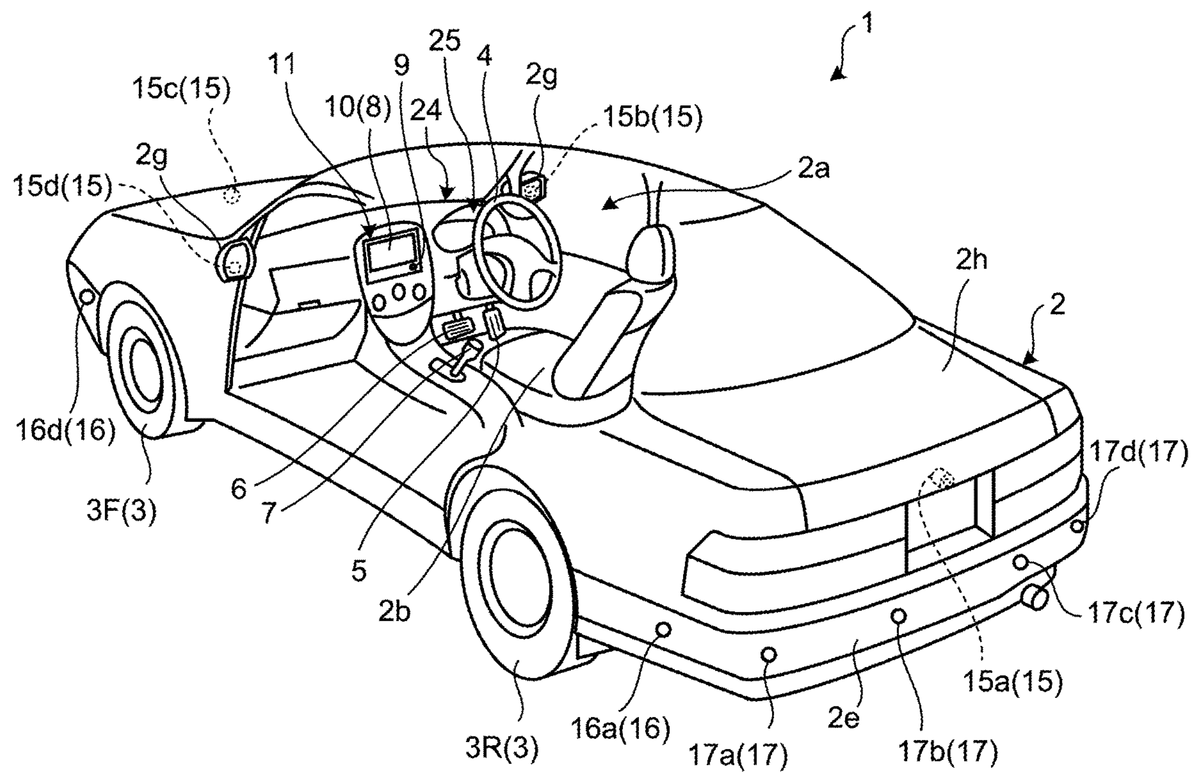

As illustrated in FIG. 1, a vehicle body 2 constitutes a cabin 2*a* in which an occupant (not illustrated) rides. In the cabin 2*a*, a steering unit 4, an accelerating operation unit 5, a braking operation unit 6, a gear shift operating unit 7, and the like are provided in a state of facing a seat 2*b* of a driver as an occupant. The steering unit 4 is a steering wheel protruding from a dash board 24, for example. The accelerating operation unit 5 is an accelerator pedal positioned at the driver's foot, for example. The braking operation unit 6 is a brake pedal positioned at the driver's foot, for example. The gear shift operating unit 7 is a shift lever protruding from a center console, for example. The steering unit 4, the accelerating operation unit 5, the braking operation unit 6, and the gear shift operating unit 7 are not limited to the above.

In the cabin 2*a*, a display device 8 as a display output unit and a sound output device 9 as a sound output unit are provided. The display device 8 is a liquid crystal display (LCD) or an organic electroluminescent display (OELD), for example. The sound output device 9 is a speaker, for example. The display device 8 is covered by a transparent operation input unit 10 such as a touch panel. An occupant can visually identify an image displayed on a display screen of the display device 8 via the operation input unit 10. The occupant can also perform operation input by touching, pressing, manipulating, or operating the operation input unit 10 with the fingers and the like at a position corresponding to the image displayed on the display screen of the display device 8. The display device 8, the sound output device 9, and the operation input unit 10 are provided to a monitor device 11 positioned in the center in a vehicle width direction, that is, in the right and left direction of the dash board 24, for example. The monitor device 11 can have an operation input unit (not illustrated) such as a switch, a dial, a joystick, and a push button. A sound output device (not illustrated) can be arranged at positions other than the monitor device 11 in the cabin 2*a*, and the sound output device 9 of the monitor device 11 and another sound output device can output sound. The monitor device 11 can be doubled as a navigation system or an audio system, for example.

Figure 3:
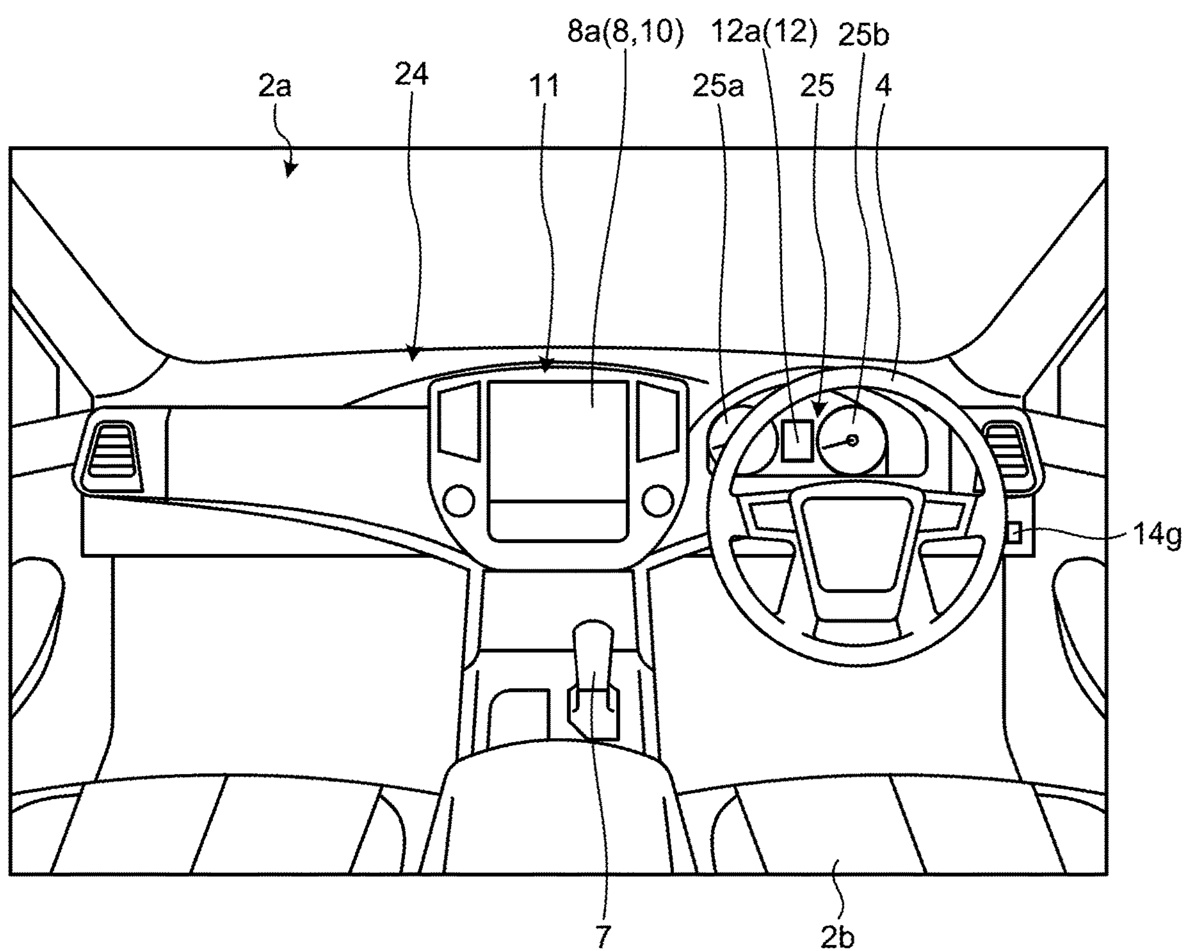
FIG. 3 is a diagram of an example of a dash board of the vehicle according to the embodiment when viewed from the rear side of the vehicle.

In the cabin 2*a*, a display device 12 different from the display device 8 is provided. As illustrated in FIG. 3, the display device 12 is arranged on an instrument panel unit 25 of the dash board 24, for example, and is positioned between a speed indicating unit 25*a* and a revolution indicating unit 25*b* in the substantially center of the instrument panel unit 25. The size of a screen 12*a* of the display device 12 is smaller than that of a screen 8*a* (FIG. 3) of the display device 8. The display device 12 can primarily display an image indicating information on parking assistance of the vehicle 1. The amount of information displayed on the display device 12 may be smaller than that displayed on the display device 8. The display device 12 is an LCD or an OELD, for example. The display device 8 may display information displayed on the display device 12.

Figure 2:
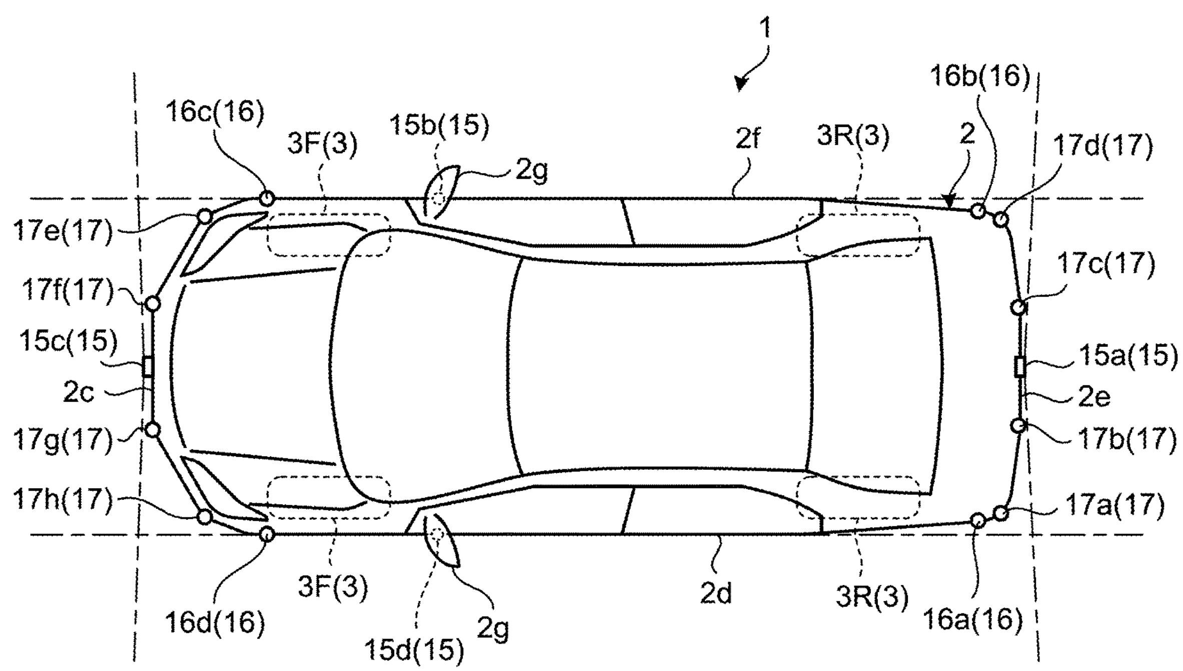
FIG. 2 is an exemplary plan view of the vehicle according to the embodiment.

As illustrated in FIGS. 1 and 2, the vehicle 1 is a four-wheel automobile, for example, and has two right and left front wheels 3F and two right and left rear wheels 3R. All of these four wheels 3 can be steered. As illustrated in FIG. 4, the vehicle 1 has a steering system 13 configured to steer at least two wheels 3. The steering system 13 includes an actuator 13*a* and a torque sensor 13*b*. The steering system 13 is electrically controlled by an electronic control unit (ECU) 14 and the like to operate the actuator 13*a*. The steering system 13 is an electric power steering system or a steer-by-wire (SBW) system, for example. The steering system 13 causes the actuator 13*a* to add torque or assist torque to the steering unit 4 to assist steering effort or causes the actuator 13*a* to steer the wheel(s) 3. In this case, the actuator 13*a* may steer one wheel 3 or a plurality of wheels 3. The torque sensor 13*b* detects torque given to the steering unit 4 by the driver, for example.

As illustrated in FIG. 2, four imaging units 15*a* to 15*d*, for example, are provided as a plurality of imaging units 15 in the vehicle body 2. The imaging units 15 are a digital camera that incorporates an imaging element thereinto, such as a charge coupled device (CCD) and a CMOS image sensor (CIS), for example. The imaging units 15 can output moving image data at a predetermined frame rate. The imaging units 15 each have a wide-angle lens or a fish-eye lens and can photograph the range from 140° to 190°, for example, in the horizontal direction. The optical axis of each of the imaging units 15 is set to be directed obliquely downward. Thus, the imaging units 15 sequentially photograph the external environment surrounding the vehicle body 2 including road surfaces on which the vehicle 1 can travel and areas in which the vehicle 1 can be parked, and output it as imaged image data.

The imaging unit 15*a* is positioned at an end 2*e* on the rear side of the vehicle body 2, and is provided to a wall in the lower portion of a door 2*h* of a rear trunk, for example. The imaging unit 15*b* is positioned at an end 2*f* on the right side of the vehicle body 2, and is provided to a door mirror 2*g* on the right side, for example. The imaging unit 15*c* is positioned at an end 2*c* on the front side of the vehicle body 2, that is, on the front side in the fore-and-aft direction of the vehicle, and is provided to a front bumper and the like, for example. The imaging unit 15*d* is positioned at an end 2*d* on the left side of the vehicle body 2, that is, on the left side in the vehicle width direction, and is provided to a door mirror 2*g* as a protruding part on the left side, for example. The ECU 14 can perform arithmetic processing and image processing based on image data obtained by the imaging units 15 to generate an image having a wider angle of visibility or generate a virtual bird's eye view image when the vehicle 1 is viewed from above. The bird's eye view image can also be referred to as a plane image.

The ECU 14 also identifies a division line and the like designated on road surfaces around the vehicle 1 using images obtained by the imaging units 15, and detects (extracts) a parking section designated by the division line.

As illustrated in FIGS. 1 and 2, four distance measuring units 16*a* to 16*d* and eight distance measuring units 17*a* to 17*h*, for example, are provided as a plurality of distance measuring units 16 and 17 in the vehicle body 2. The distance measuring units 16 and 17 are a sonar that emits ultrasound and captures its reflected wave, for example. The sonar can also be referred to as a sonar sensor or an ultrasonic sonar. The ECU 14 can measure the presence of an object such as an obstacle located around the vehicle 1 and the distance to the object, based on detection results from the distance measuring units 16 and 17. Specifically, the distance measuring units 16 and 17 are examples of a detection unit configured to detect objects. The distance measuring units 17 can be used to detect objects at a relatively short distance, for example, while the distance measuring units 16 can be used to detect objects at a relatively long distance that is farther than the objects the distance measuring units 17 detect, for example. The distance measuring units 17 can be used to detect objects ahead and behind the vehicle 1, while the distance measuring units 16 can be used to detect objects at the lateral sides of the vehicle 1, for example.

As illustrated in FIG. 4, in a parking assistance system 100, a brake system 18, a steering angle sensor 19, an accelerator sensor 20, a shift sensor 21, a wheel speed sensor 22, and the like are electrically connected via an in-vehicle network 23 as an electric communication line, in addition to the ECU 14, the monitor device 11, the steering system 13, and the distance measuring units 16 and 17. The in-vehicle network 23 is configured as a controller area network (CAN), for example. The ECU 14 can control the steering system 13, the brake system 18, and the like by transmitting control signals to them via the in-vehicle network 23. The ECU 14 can also receive detection results from the torque sensor 13*b*, a brake sensor 18*b*, the steering angle sensor 19, the distance measuring units 16, the distance measuring units 17, the accelerator sensor 20, the shift sensor 21, the wheel speed sensor 22, and the like as well as operation signals from the operation input unit 10 and the like via the in-vehicle network 23.

The ECU 14 has a central processing unit (CPU) 14*a*, a read only memory (ROM) 14*b*, a random access memory (RAM) 14*c*, a display control unit 14*d*, a sound control unit 14*e*, and a solid state drive (SSD, flash memory) 14*f*, for example. The CPU 14*a* can perform a variety of arithmetic processing and control, such as image processing concerned with images displayed on the display devices 8 and 12, determination of a travel target position (a parking target position) of the vehicle 1, arithmetic processing of a travel route (a parking guidance route) of the vehicle 1, judgment as to whether interference with an object is present, automatic control of the vehicle 1, and release of automatic control. The CPU 14*a* can read a computer program installed and stored in a nonvolatile memory such as the ROM 14*b*, and perform arithmetic processing in accordance with the program. The RAM 14*c* temporarily stores therein various types of data to be used for arithmetic processing performed by the CPU 14*a*. The display control unit 14*d* primarily performs image processing that uses the image data obtained by the imaging units 15 and composition of image data displayed on the display device 8, out of the arithmetic processing performed by the ECU 14. The sound control unit 14*e* primarily processes sound data output by the sound output device 9, out of the arithmetic processing performed by the ECU 14. The SSD 14*f* is a rewritable nonvolatile memory and can store therein data even when the power of the ECU 14 is turned off. The CPU 14*a*, the ROM 14*b*, the RAM 14*c*, and the like can be integrated in the same package. The ECU 14 may have a configuration in which other logical operation processor such as a digital signal processor (DSP) or a logic circuit is used instead of the CPU 14*a*. A hard disk drive (HDD) may be provided instead of the SSD 14*f*, and the SSD 14*f* and the HDD may be provided separately from the ECU 14.

The brake system 18 is an anti-lock brake system (ABS) that prevents locking of the brake, electronic stability control (ESC) that prevents a skid of the vehicle 1 during cornering, an electric brake system that increases braking force (performs brake assist), or brake by wire (BBW), for example. The brake system 18 applies braking force to the wheels 3, in turn to the vehicle 1 via an actuator 18*a*. The brake system 18 can perform a variety of control by detecting locking of the brake, idling of the wheels 3, and a sign of a skid based on the rotational difference between the right and left wheels 3. The brake sensor 18*b* is a sensor configured to detect the position of a movable part of the braking operation unit 6, for example. The brake sensor 18*b* can detect the position of a brake pedal serving as the movable part. The brake sensor 18*b* includes a displacement sensor.

The steering angle sensor 19 is a sensor configured to detect the steering amount of the steering unit 4 such as a steering wheel, for example. The steering angle sensor 19 is configured by using a Hall element, for example. The ECU 14 acquires the steering amount of the steering unit 4 by the driver, the steering amount of each wheel 3 during automatic steering, and the like from the steering angle sensor 19 to perform a variety of control. The steering angle sensor 19 detects the turning angle of a turning part included in the steering unit 4. The steering angle sensor 19 is an example of an angle sensor.

The accelerator sensor 20 is a sensor configured to detect the position of a movable part of the accelerating operation unit 5, for example. The accelerator sensor 20 can detect the position of an accelerator pedal serving as the movable part. The accelerator sensor 20 includes a displacement sensor.

The shift sensor 21 is a sensor configured to detect the position of a movable part of the gear shift operation unit 7, for example. The shift sensor 21 can detect the position of a lever, an arm, a button, and the like serving as the movable part. The shift sensor 21 may include a displacement sensor or may be configured as a switch.

The wheel speed sensor 22 is a sensor configured to detect the rotation amount and the rotation speed per unit time of the wheel(s) 3. The wheel speed sensor 22 outputs a wheel speed pulse number indicating the detected rotation speed as a sensor value. The wheel speed sensor 22 is configured by using a Hall element, for example. The ECU 14 calculates the travel amount and the like of the vehicle 1 based on the sensor value acquired from the wheel speed sensor 22 to perform a variety of control. The wheel speed sensor 22 is provided in the brake system 18 in some cases. In such cases, the ECU 14 acquires the detection result of the wheel speed sensor 22 via the brake system 18.

The configurations, arrangements, and electrical connections of various sensors and actuators described above are merely examples, and can be set (changed) in various ways.

Figure 5:
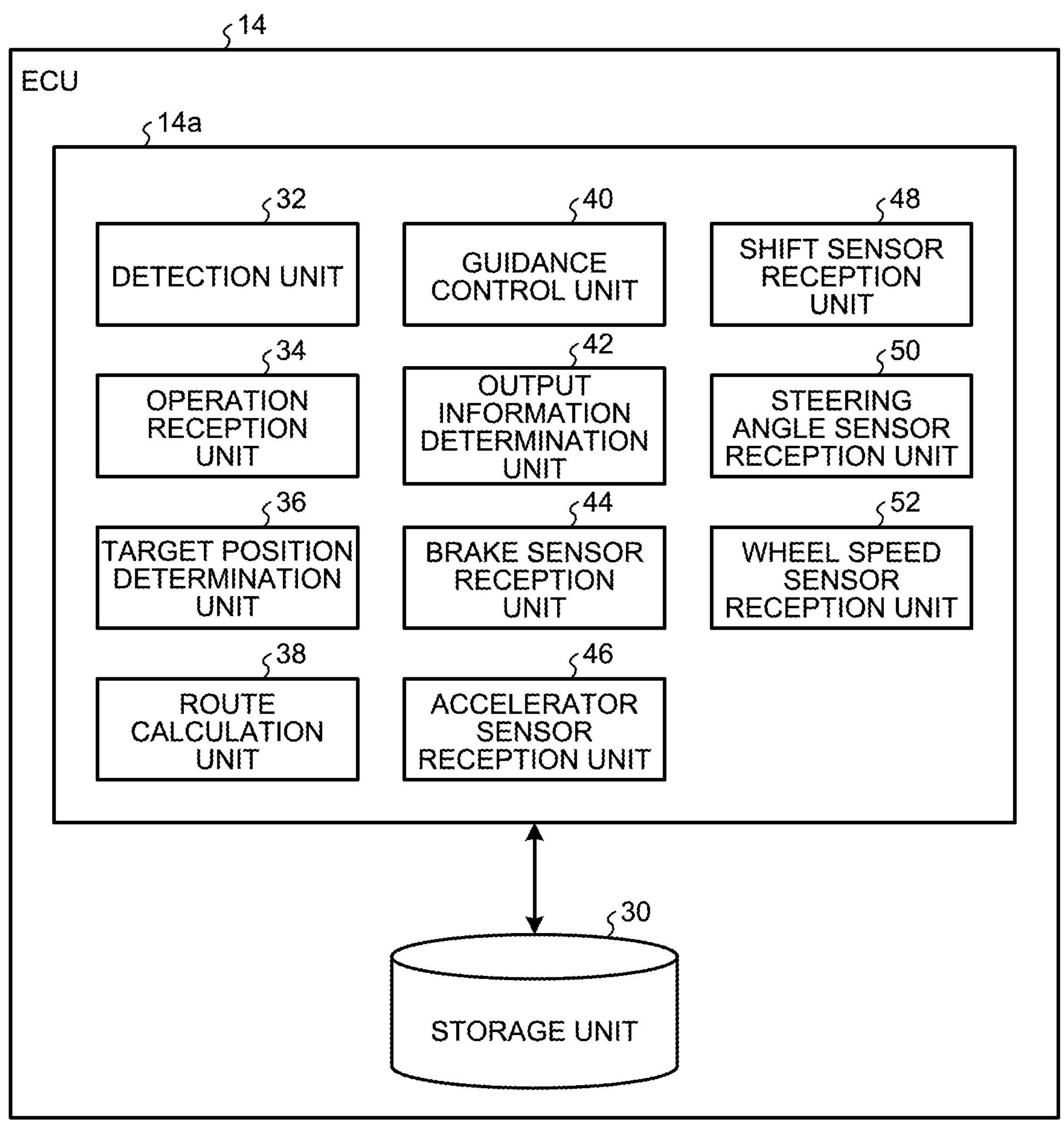
FIG. 5 is an exemplary block diagram illustrating a configuration of an ECU of the parking assistance system according to the embodiment.

As illustrated in FIG. 5, the ECU 14 includes the CPU 14*a* and a storage unit 30 that stores therein data for use in the arithmetic processing by the CPU 14*a* or calculated by the arithmetic processing by the CPU 14*a*. The CPU 14*a* includes various kinds of modules achieved by reading and executing the computer program installed and stored in the memory such as the ROM 14*b*. The CPU 14*a* includes a detection unit 32, an operation reception unit 34, a target position determination unit 36, a route calculation unit 38, a guidance control unit 40, an output information determination unit 42, a brake sensor reception unit 44, an accelerator sensor reception unit 46, a shift sensor reception unit 48, a steering angle sensor reception unit 50, and a wheel speed sensor reception unit 52, for example.

The detection unit 32 detects an obstacle, a frame line, a division line, and the like on the road surfaces around the vehicle 1 based on the information provided from the imaging units 15 and the distance measuring units 16 and 17. The detection unit 32 can also function as a detection unit configured to detect a parkable area in a surrounding area of the vehicle 1 based on the detected obstacle, frame line, division line, and the like. The operation reception unit 34 acquires a signal by operation input on an operation unit 14*g*. The operation unit 14*g* is a push button or a switch, for example, and can request or cancel parking assistance. The target position determination unit 36 determines the travel target position, that is, the parking target position of the vehicle 1. The route calculation unit 38 calculates the travel route or the parking guidance route for guiding the vehicle 1 to the parking target position contained in the parkable area from the current position of the vehicle 1. The guidance control unit 40 controls the units of the vehicle 1 so as to cause the vehicle 1 to travel to the travel target position or the parking target position along the travel route or the parking guidance route. The output information determination unit 42 determines information to be output by the display devices 12 and 8, the sound output device 9, and the like, the output mode of the information, and the like.

The brake sensor reception unit 44 acquires a signal output from the brake sensor 18*b*, that is, a signal based on the operation input of the braking operation unit 6 such as the brake pedal. The brake sensor reception unit 44 functions as an intention confirmation unit that acquires an intention confirmation signal about the deceleration or the parking or stopping of the driver (a user). The brake sensor reception unit 44 may acquire the operation input of a parking brake (not illustrated) and may function to acquire the intention confirmation signal about the parking or stopping of the driver based on this operation input. The accelerator sensor reception unit 46 acquires a signal output from the accelerator sensor 20, that is, a signal based on the operation input of the accelerating operation unit 5 such as the accelerator pedal. The accelerator sensor reception unit 46 functions as an intention confirmation unit that acquires the intention confirmation signal about the travel, the acceleration of the driver. The shift sensor reception unit 48 acquires a signal output from the shift sensor 21, that is, a signal based on the operation input of the gear shift operating unit 7 such as the shift lever. The shift sensor reception unit 48 functions as an intention confirmation unit that acquires the intention confirmation signal of the advancing of the driver by the reception of a signal indicating "D Position" and acquires the intention confirmation signal of the reversing of the driver by the reception of a signal indicating "R Position." Similarly, the shift sensor reception unit 48 functions as an intention confirmation unit that acquires the intention confirmation signal of the parking or stopping of the driver by the reception of a signal indicating "P Position." The steering angle sensor reception unit 50 acquires a signal output from the steering angle sensor 19, that is, a signal based on the operation input of the steering unit 4 such as the steering wheel. The steering angle sensor reception unit 50 functions as an intention confirmation unit that acquires the steering state of the vehicle 1 and acquires an intention confirmation signal indicating the intention of the driver to steer. The wheel speed sensor reception unit 52 acquires a signal output from the wheel speed sensor 22, acquires information determining the traveling state or the stopping state of the vehicle 1 based on a vehicle speed, and functions as an information acquisition unit when whether a guided state is good or bad is determined when the vehicle 1 is automatically guided for parking. Although an example in which the above modules are separately configured by function has been described, two functions or more functions may be integrated. The brake sensor reception unit 44, the accelerator sensor reception unit 46, the shift sensor reception unit 48, the steering angle sensor reception unit 50, and the wheel speed sensor reception unit 52 may be integrated as a sensor reception unit, for example.

Figure 6:
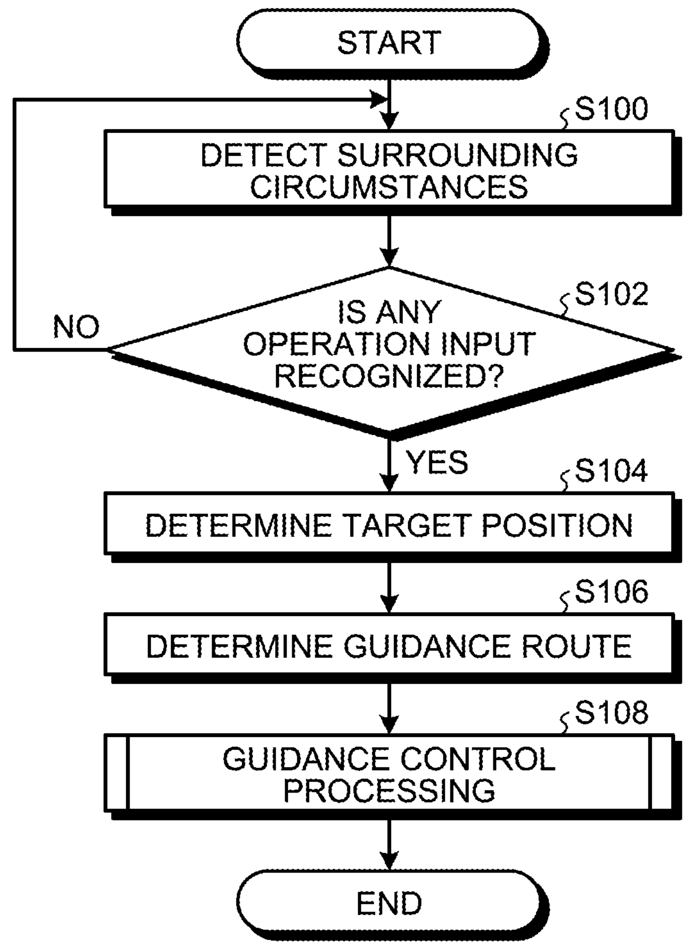
FIG. 6 is a flowchart illustrating parking assistance processing by the parking assistance system according to the embodiment.

FIG. 6 is a flowchart illustrating an outline of parking assistance processing by the parking assistance system 100 according to the present embodiment. First, the detection unit 32 of the CPU 14*a* detects an obstacle, a frame line, a division line, and the like around the vehicle 1 based on the information provided from the imaging units 15 and the distance measuring units 16 and 17 (S100). As to the imaging units 15 and the distance measuring units 16 and 17, all of them may be constantly functioned, or part of them may be selectively functioned when the power switch of the vehicle 1 is turned on. The imaging units 15 and the distance measuring units 16 and 17 may be used separately for a normal travel mode, a parking assistance mode, and the like, for example. A detection period, a detection area, and detection accuracy may be switched for the normal travel mode, the parking assistance mode, and the like, for example. The CPU 14*a* waits for the reception of operation input requesting the start of parking assistance via the operation reception unit 34. If no reception of input operation is recognized (No at S102), the process returns to S100, in which surrounding circumstances are detected to construct information. In contrast, if any reception of operation input is recognized at S102 (Yes at S102), in other words, if the user shows an intention to park and wants to search for a parking place, processing to determine a target position by the target position determination unit 36 is started (S104). Although details will be described below, the target position determination unit 36 searches for a space in which the vehicle 1 can be parked, that is, the parkable area considering the size of the vehicle 1 based on the information input from the imaging units 15, the distance measuring units 16 and 17, and the like and determines the parking target position as a target for guiding the vehicle 1 to the space. Upon determination of the parking target position, the route calculation unit 38 determines the parking guidance route for guiding the vehicle 1 to the parking target position contained in the parkable area from the current position of the vehicle 1 (S106). For the calculation of the parking guidance route, various kinds of known methods of route calculation can be used, and a detailed description thereof is omitted. Upon determination of the parking guidance route, the guidance control unit 40 of the CPU 14*a* performs automatic steering by the steering system 13 and guidance control processing by travel using creeping (S108). Details of the guidance control processing will be described below. When the vehicle 1 is an electric vehicle, a hybrid vehicle, or the like, the vehicle 1 may be traveled at a low speed by motor control to be guided. Prior to the start of the guidance control, the output information determination unit 42 of the CPU 14*a* performs display about operations requested to the user at the start of and during the parking assistance such as switching between advancing and reversing by a shift lever operation and speed adjustment.

Figure 7:
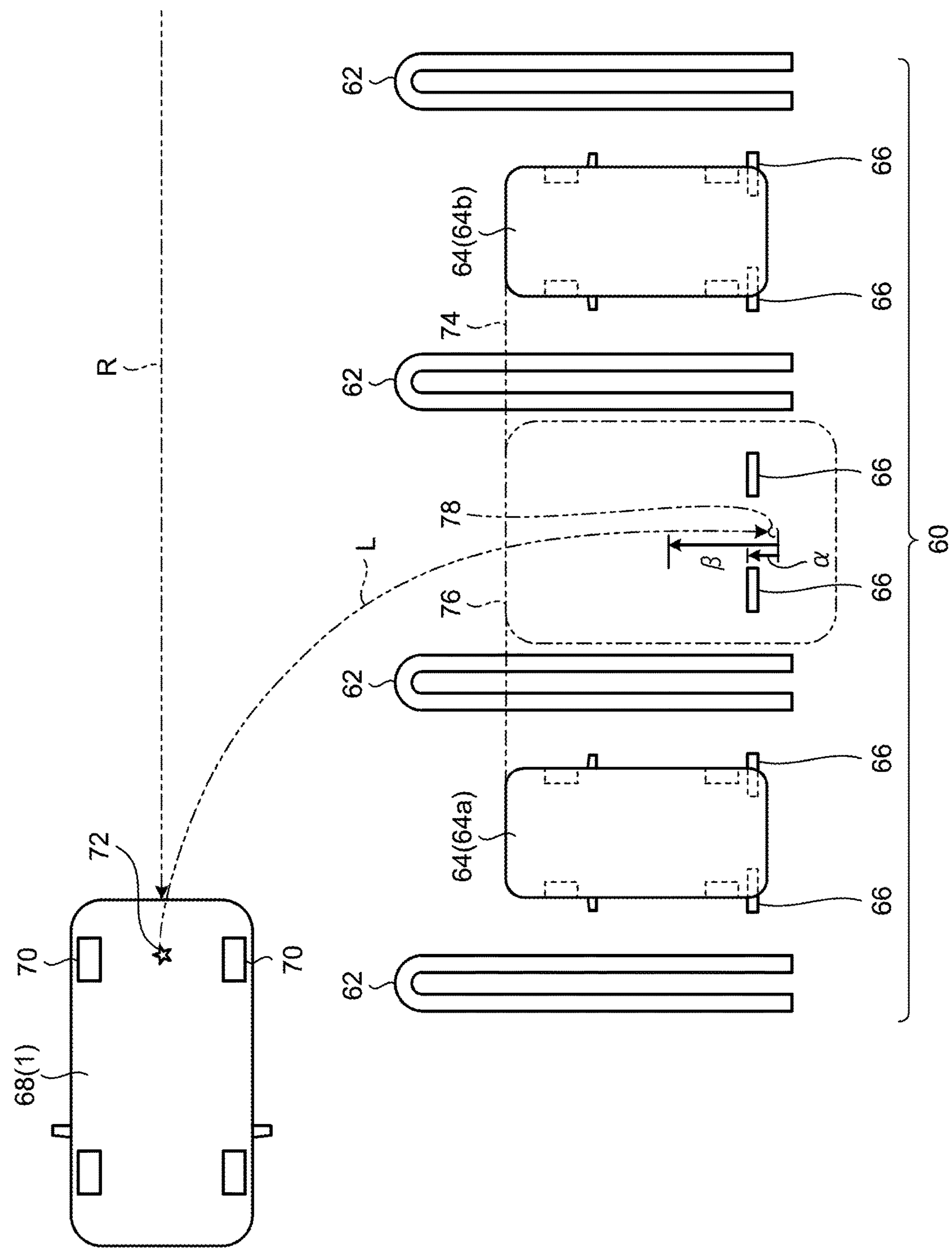
FIG. 7 is a diagram illustrating the behavior of a vehicle and how a parkable area is detected in a parking lot in order to describe the parking assistance processing by the parking assistance system according to the embodiment.

Prior to the description of the guidance control processing at S108 in FIG. 6, the following describes the behavior of a vehicle mounting the parking assistance system 100 in a parking lot and how the parkable area is detected with reference to FIG. 7. In the example illustrated in FIG. 7, a parking lot 60 is divided into parking sections each of which is for one vehicle by a plurality of division lines 62 drawn on the plane road. FIG. 7 illustrates parking sections for three vehicles, for example. FIG. 7 illustrates an example in which adjacent parked vehicles 64 (a left adjacent vehicle 64*a* and a right adjacent vehicle 64*b*) are present on the right and left of the three sections. The respective adjacent parked vehicles 64 (64*a* and 64*b*) are parked with their rear wheels in contact with wheel stops 66. When the parking assistance is performed, a vehicle may be controlled to be parked with the vehicle's front-end aligned considering parking balance with the adjacent parked vehicles 64. FIG. 7 is a diagram illustrating an example in which when a subject vehicle 68 stops before reaching the parking target position during the parking assistance, a situation occurs in which rear wheels 70 come into contact with the wheel stops 66 and cannot reverse any more, for example. In this case, it is assumed that the right and left adjacent parked vehicles 64 in FIG. 7 are light vehicles, for example. In other words, it is assumed that the adjacent parked vehicles 64 are shorter in length in the fore-and-aft direction of the vehicle than the subject vehicle 68 mounting the parking assistance system 100 according to the present embodiment. It is assumed that the subject vehicle 68 is equivalent to the vehicle 1 illustrated in FIG. 1 to FIG. 3 and mounts the parking assistance system 100 illustrated in FIG. 4. The present embodiment describes a case in which the subject vehicle 68 is guided to enter the parkable area detected as being parkable among the parking sections by reversing to be parked therein, for example.

When entering the parking lot 60, the subject vehicle 68 detects whether there is any parking section or space that can be a parkable area in a surrounding area of the subject vehicle 68 using the detection unit 32 while traveling at a low speed. In this case, the detection unit 32 searches for the parkable area using the imaging units 15 and the distance measuring units 16 and 17 as described above. The subject vehicle 68, while traveling in the parking lot 60 at a low speed in a direction of the arrow R along the arrangement direction of the division lines 62, detects the position and the size of an object as an obstacle when the subject vehicle 68 is guided to be parked such as another vehicle using the distance measuring units 16 and 17, for example. In this case, the distance measuring units 16*a* and 16*d* and the like on the left side of the vehicle in FIG. 2 detect the adjacent parked vehicle 64 and the like. In addition, the imaging unit 15*d* on the left side of the vehicle in FIG. 2 mainly detects the position and spacing of the division line 62 and the like and the depth and the like of the division line 62, which are difficult to be detected by the distance measuring units 16 and 17. When determining that the distance between obstacles, or between the two adjacent parked vehicles 64 in the vehicle width direction in FIG. 7, is larger than a value obtained by adding a certain marginal distance to be ensured in both sides of the vehicle to the vehicle width of the subject vehicle 68, the detection unit 32 detects this space as a candidate for the parkable area. A plurality of such candidates for the parkable area may be detected, the user, for example, may be caused to select one of the detected candidates, or the parking assistance system 100 may select a parkable area in the best condition out of the detected candidates. The detection may be ended when the parkable area is first detected, and the area may be regarded as the parkable area to which the subject vehicle 68 will be guided.

Upon determination of the parkable area, the target position determination unit 36 determines the parking target position for guiding the subject vehicle 68. In the present embodiment, the subject vehicle 68 sets a guidance reference point 72 at substantially the central part of an axle shaft connecting the right and left rear wheels 70, for example. The position of the guidance reference point 72 is not limited onto the axle shaft and may be set to any position of the subject vehicle 68. Guidance is performed so as to cause this guidance reference point 72 to substantially match the parking target position set in the parkable area determined prior to the start of the guidance, thereby assisting the parking of the subject vehicle 68 in the parkable area. As described above, when determining the parking target position, the target position determination unit 36 can determine the parking target position considering the parking balance with the adjacent parked vehicles 64, for example. Parking is performed with the degree of protrusion on the travel road side of the subject vehicle 68 aligned with that of an adjacent vehicle, for example. For this purpose, the target position determination unit 36 sets a reference line 74 connecting the travel road side front-ends of the right and left adjacent parked vehicles 64 and sets a parking frame 76 that causes the travel road side front-end of the subject vehicle 68 to substantially match the reference line 74. The distance from the front-end of the subject vehicle 68 to the guidance reference point 72 is structurally uniquely determined in the subject vehicle 68, and when the parking frame 76 is determined, a corresponding parking target position 78 is determined. When the adjacent parked vehicles 64 are vehicles the size of which is similar to that of the subject vehicle 68, the reference line 74 will be set closer to the travel road side than the state illustrated in FIG. 7. Consequently, the parking frame 76 and the parking target position 78 will also shift to the travel road side.

As illustrated in FIG. 7, the route calculation unit 38 calculates a parking guidance route L that guides the subject vehicle 68 so as to cause the guidance reference point 72 to substantially match the parking target position 78 by a known method. The guidance control unit 40 can achieve favorable parking assistance by performing automatic steering control together with travel by creeping. In such parking assistance, the user does not basically perform any travel operation and waits for the guidance reference point 72 of the subject vehicle 68 to reach the parking target position 78 and the guidance to be completed. However, before the subject vehicle 68 completely fits into the set parking frame 76, that is, before the guidance reference point 72 reaches the parking target position 78, the subject vehicle 68 may stop in some cases; examples of the cases include a case in which the rear wheel 70 has come into contact with the wheel stop 66. In such a case, even though the subject vehicle 68 has stopped, the guidance by the guidance control unit 40 and the output of guidance display and the like by the output information determination unit 42 are continuously performed, which may cause the user's troublesomeness or uncomfortableness.

Given these circumstances, the guidance control unit 40 of the parking assistance system 100 according to the present embodiment includes a plurality of completion patterns of parking assistance. A normal completion pattern is included that completes the guidance when the subject vehicle 68 has fit into the parking frame 76 with a certain attitude and has reached the parking target position 78, for example. In this case, the guidance can be completed when the guidance reference point 72 and the parking target position 78 match each other. When the parking guidance control is performed, considering an error of the parking target position 78 set by the imaging units 15 and the distance measuring units 16 and 17, a first completion area offset by a first extension α such as 0.3 meter toward the travel road side based on the parking target position 78 may be set, for example. In other words, when the guidance reference point 72 has reached the first completion area set based on the parking target position 78, it is regarded that the parking target position 78 and the guidance reference point 72 match each other. In other words, with parking assistance processing regarded as having been completed, the guidance and the display of a guidance screen may be ended. In this case, the guidance control unit 40 and the output information determination unit 42 quickly end the guidance, the guidance display along with the guidance, and the like to complete the parking assistance control. Consequently, the user's troublesomeness or uncomfortableness by excessive guidance and screen display can be reduced or prevented.

Figure 8:
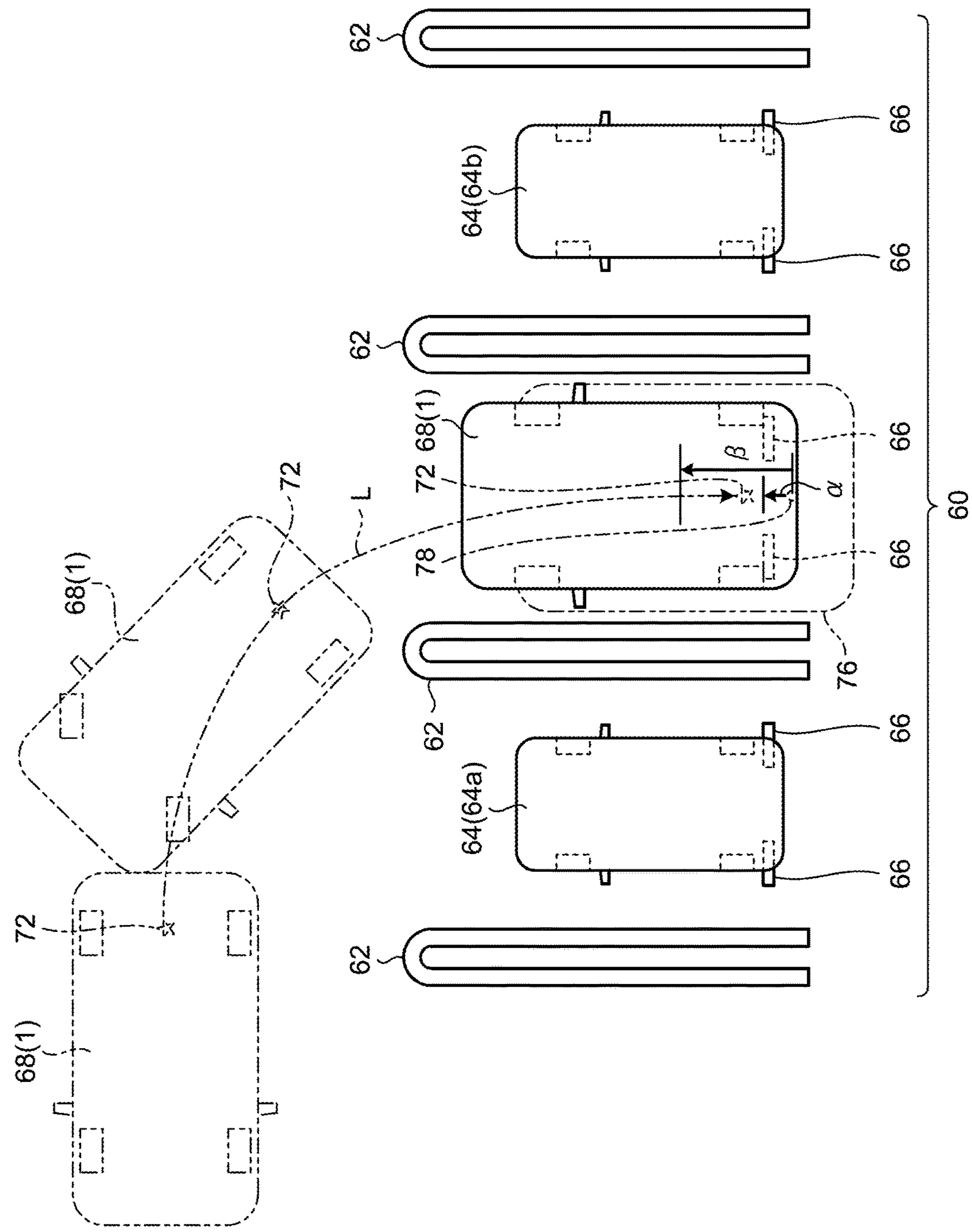
FIG. 8 is a diagram illustrating an example in which the vehicle has stopped by wheel stops before reaching a parking target position in the parking lot in order to describe the parking assistance processing by the parking assistance system according to the embodiment.
Figure 9:
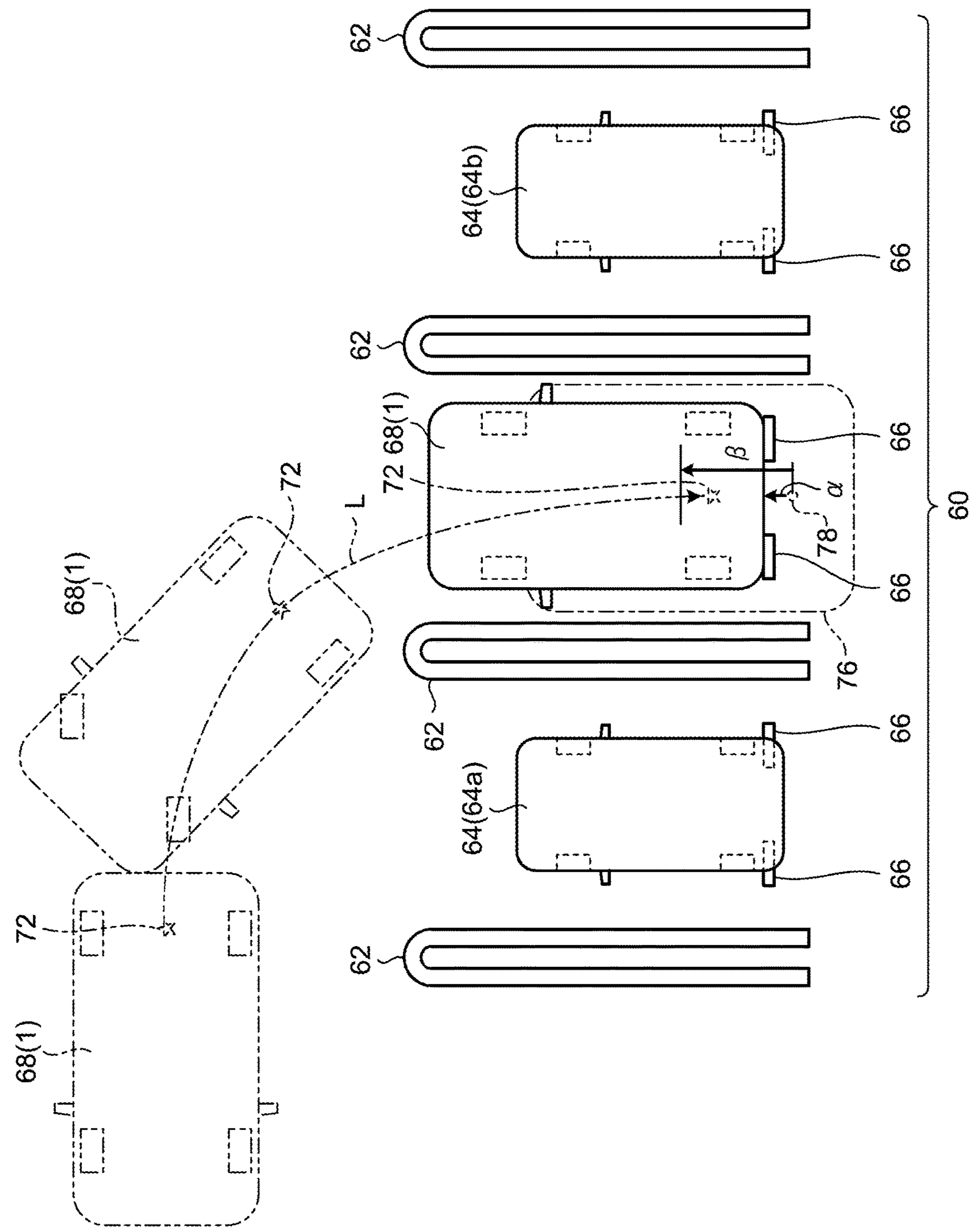
FIG. 9 is a diagram illustrating an example in which the vehicle has stopped before reaching the parking target position in the parking lot in order to describe the parking assistance processing by the parking assistance system according to the embodiment.

The guidance control unit 40 includes a special completion pattern that varies a completion extension period until the guidance of the vehicle is completed when the subject vehicle 68 has entered the parking frame 76 with the certain attitude, and when the subject vehicle 68 has stopped before reaching the parking target position 78. In this case, a second completion area offset by a second extension β such as 1.0 meter from the parking target position 78, which is closer to the travel road side than the first extension α based on the parking target position 78, may be set, for example. The second extension β defining the second completion area is a value defining a limiting point at which it can be regarded that the user can easily complete the parking of the subject vehicle 68 simply by reversing even if the parking assistance has been completed in that state. In other words, when the guidance reference point 72 has reached the second completion area set based on the parking target position 78, in which a substantial stop of the subject vehicle 68 occurs, the guidance control unit 40 and the output information determination unit 42 determine that the guidance of the subject vehicle 68 to the parking frame 76 has been completed or may be regarded as having been completed. In other words, with the parking guidance processing regarded as having been completed, the guidance control unit 40 and the output information determination unit 42 may end the guidance and the display of the guidance screen. Thus, in the present embodiment, if the subject vehicle 68 has entered the parking frame 76 with the certain attitude by the certain amount (if it has entered the parking frame 76 by a certain amount of distance), the guidance control unit 40 and the output information determination unit 42 end the guidance and the output of the guidance display and the like along with the guidance based on the stop of the subject vehicle 68 before reaching the parking target position 78. There are two reasons for the case in which the subject vehicle 68 stops midway through the guidance. In other words, the case includes a case in which the user intentionally stops the subject vehicle 68 and a case in which the subject vehicle 68 stops unintentionally. The stop intended by the user is a case in which the rear wheel 70 of the subject vehicle 68 comes into contact with the wheel stop 66, and the user pushes down the brake pedal to stop the subject vehicle 68, for example. Such a situation can occur when the determination of the parking target position 78 based on the parking frame 76 set based on the travel road side front-end of the adjacent parked vehicles 64 is not appropriate as illustrated in FIG. 8, for example. As illustrated in FIG. 9, such a situation can also occur when the user determines that the subject vehicle 68 may be parked at this position with the user's own conviction and has stopped the subject vehicle 68 by pushing down the brake pedal before contacting the wheel stop 66 or before reaching the parking target position 78.

In contrast, the stop not intended by the user is a stop not accompanied by operation input by the user; examples of the stop includes a case in which the road surface of the parking lot 60 is an uphill slope toward the wheel stop 66, and the gradient of the uphill slope and the driving force during the travel by creeping balance to stop the subject vehicle 68 and a case in which when there are irregularities on the road surface of the parking lot 60, the rear wheels 70 stop owing to the irregularities to stop the subject vehicle 68. The relation between the position of the rear wheels 70 of the subject vehicle 68 and the wheel stops 66 and the relation between the guidance reference point 72 and the parking target position 78 are similar to those in the case of FIG. 9. When the guidance, the guidance display, and the like end at the same timing in the stop intended by the user and in the stop not intended thereby, the user may feel uncomfortable. When the guidance and the guidance display linger in the case of the intentional stop, for example, troublesomeness may be caused. In contrast, when the guidance and the guidance display immediately end in the case of the unintentional stop, which is contrary to the expectation of the guidance, uncomfortableness may be caused. Given these circumstances, when the subject vehicle 68 has entered the parking frame 76 (the parkable area) with the certain attitude, and when the subject vehicle 68 has stopped before reaching the parking target position 78, the parking assistance system 100 according to the present embodiment varies the completion extension period until the guidance of the subject vehicle 68 is completed in accordance with the stop mode of the subject vehicle 68. As described above, the stop mode of the subject vehicle 68 is a vehicle stop mode (a first stop mode) in which the subject vehicle 68 has been stopped by the intention of the user and a vehicle stop mode (a second stop mode) in which the subject vehicle 68 has stopped regardless of the intention of the user, for example. Consequently, when operation input indicating that the brake pedal has been pushed down during the parking assistance is detected, for example, it can be regarded that the subject vehicle 68 has stopped by the intention of the user. Also when operation input indicating that the shift lever has been moved from "R Position" to "P Position," operation input indicating that the parking brake has been activated, or the like is detected, it can be regarded that the subject vehicle 68 has been stopped by the intention of the user. In contrast, when the subject vehicle 68 has stopped without the operation input detected during the parking assistance, it can be regarded that the subject vehicle 68 has not been stopped by the intention of the user.

In the present embodiment, when it can be regarded that the subject vehicle 68 has been stopped by the intension of the user, the parking assistance is completed when the completion extension period such as 2 seconds has elapsed after the stop of the subject vehicle 68. In this process, the guidance display of the guidance and the like are also ended. In this case, difference between the intention of the user to park and the completion of the parking assistance is smaller, and the user's troublesomeness or uncomfortableness can be reduced or prevented compared with a case in which the guidance, the guidance display, and the like continue after the stop of the subject vehicle 68. In contrast, when it can be regarded that the subject vehicle 68 has stopped not by the intention of the user, the parking assistance is completed when the completion extension period such as 5 seconds has elapsed after the stop of the subject vehicle 68. In this process, the guidance display of the guidance and the like are also ended. In this case, the user is easily caused to decide that the subject vehicle 68 has stopped and the parking assistance has been canceled (completed) for some reason, and the user's uncomfortableness can be reduced or prevented.

In the present embodiment, even after the parking assistance has been started, when the subject vehicle 68 has not entered the parkable area (the parking frame 76) by the certain amount such as when the subject vehicle 68 is present at a position as indicated by the chain double-dashed line in FIG. 9, the user may operate the brake pedal (perform a braking operation) to stop the subject vehicle 68; examples of such a case include a case in which a walker has approached the subject vehicle 68. In such a case, the guidance control unit 40 and the output information determination unit 42 do not perform the control accompanied by the change of the completion extension period described above. In other words, after the operation of the brake pedal has been released, the parking assistance control performed until then is restored to continue the guidance of the subject vehicle 68. With the subject vehicle 68 having entered the second completion area, the operation input of the brake pedal (the braking operation) may be performed owing to the fact that a walker or the like has been discovered around the subject vehicle 68. In such a case, it can be regarded that the attitude of the subject vehicle 68 is already substantially straight relative to the space divided by the division lines 62 (it can be regarded that the subject vehicle 68 has already become an attitude satisfying a certain condition), and even when the parking assistance control has been completed, subsequent simple reversing may be left to the user. In other words, the setting of the second completion area, that is, the second extension β can also be regarded as a threshold set to avoid the parking assistance from being completed before the subject vehicle 68 becomes the attitude substantially straight relative to the space divided by the division lines 62.

Figure 10:
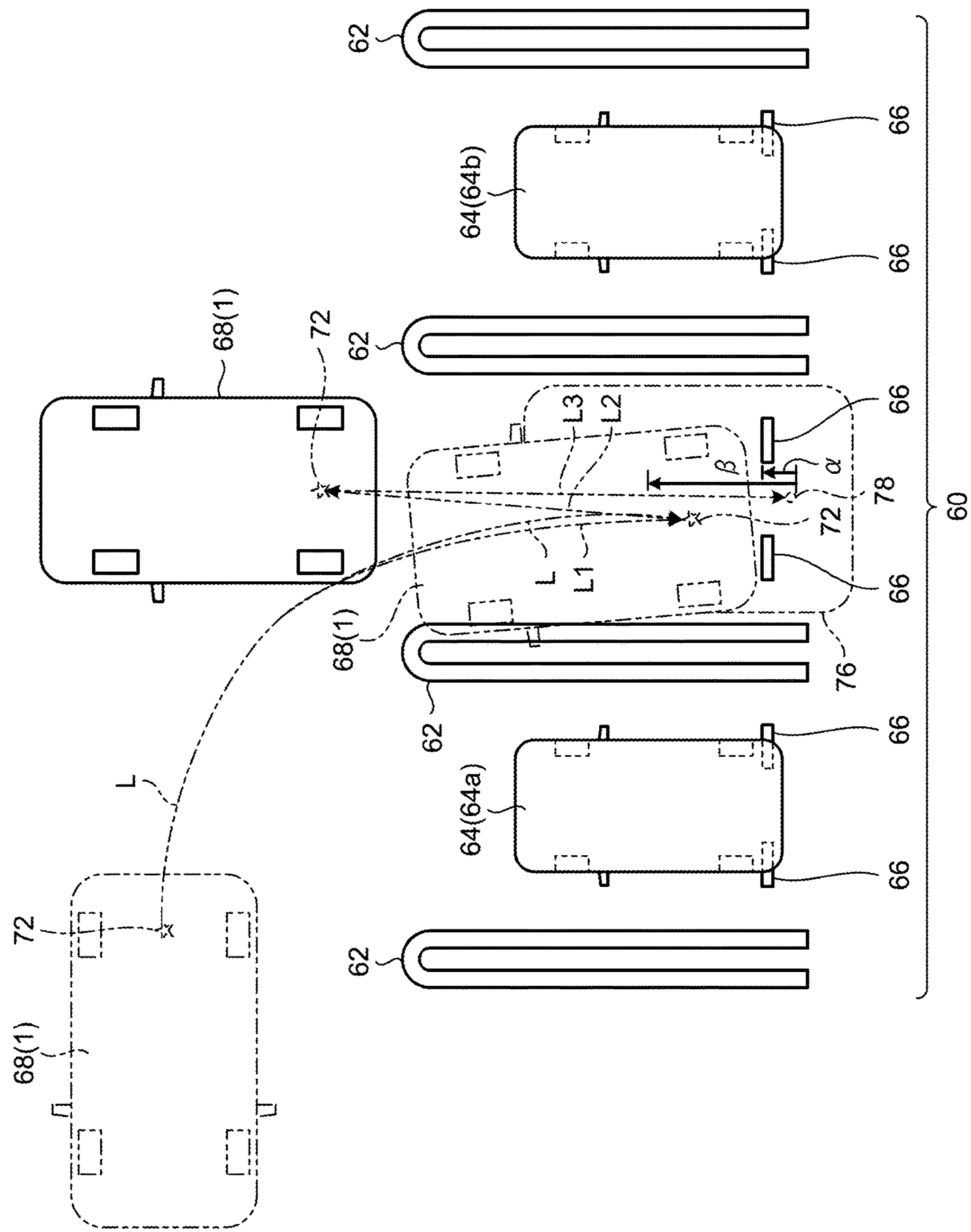
FIG. 10 is a diagram illustrating how the vehicle is correcting its attitude before reaching the parking target position in the parking lot in order to describe the parking assistance processing by the parking assistance system according to the embodiment.

Another example in which the user operates the brake pedal is a case in which the subject vehicle 68 has deviated from the parking guidance route L caused by overspeed or the like during the guidance, for example. An actual trajectory L1 of the subject vehicle 68 may deviate from the parking guidance route L as illustrated in FIG. 10, for example. In such a case, when entering the space divided by the division lines 62 beyond a certain amount such as the second extension β set for the parking target position 78, the subject vehicle 68 may take an attitude inappropriate for parking from an attitude appropriate for parking. The subject vehicle 68 may deviate from the parking guidance route L by a certain distance or more in the vehicle width direction, that is, the subject vehicle 68 may deviate toward one division line 62 to the extent beyond a certain tolerance value, for example. The central axis in the fore-and-aft direction of the subject vehicle 68 may deviate by a certain angle or more relative to a guidance direction based on the parking guidance route L, that is, the subject vehicle 68 may obliquely incline beyond a certain tolerance value relative to the space divided by the division lines 62. To park the subject vehicle 68 with a good attitude, the attitude of the subject vehicle 68 is required to be substantially straight relative to the reversing direction with the subject vehicle 68 having entered the space divided by the division lines 62 to some extent. In such a latter half of the parking operation, when the attitude of the subject vehicle 68 inclines or deviates, the user may push down the brake pedal even during the parking assistance to attempt to stop the subject vehicle 68. In this case, if the guidance control unit 40 and the output information determination unit 42 determine that the parking has been completed by the intention of the user, that is, a state in which parking may be performed has been reached, to complete the parking assistance, the user may feel uncomfortable. In other words, the user who feels uncomfortable about a vehicle attitude and has operated the brake pedal may further feel uncomfortable if the parking assistance is completed although expecting the continuation of the parking assistance. Given these circumstances, if the subject vehicle 68 has not entered the parkable area (the parking frame 76) with the certain attitude, the present embodiment determines that the attitude of the subject vehicle 68, which is one of the conditions to execute control, does not satisfy the certain attitude and reserves the completion of the guidance by the stop of the subject vehicle 68. In other words, even when there is an operation input of the brake pedal, the guidance control unit 40 and the output information determination unit 42 do not perform control accompanied by the change of the completion extension period described above. In such a case, in the present embodiment, the route calculation unit 38 recalculates the parking guidance route including additional routes L2 and L3, and the guidance control unit 40 and the output information determination unit 42 perform the guidance of the subject vehicle 68 while correcting the vehicle attitude. When an inclination angle and a deviation amount have exceeded preset standard tolerance values about the attitude of the subject vehicle 68 during the parking assistance as described above, and recalculation has been performed by the route calculation unit 38, the guidance control unit 40 and the output information determination unit 42 may change the tolerance values of the inclination angle and the deviation amount. If the tolerance values are corrected to a stricter side, for example, the guidance to the parking target position 78 can be performed with high precision, although the recalculation of the parking guidance route is likely to occur. In contrast, if the tolerance values are corrected to a looser side, repeated recalculation of the parking guidance route is prevented, and it becomes easier to quickly complete the guidance.

Figure 11:
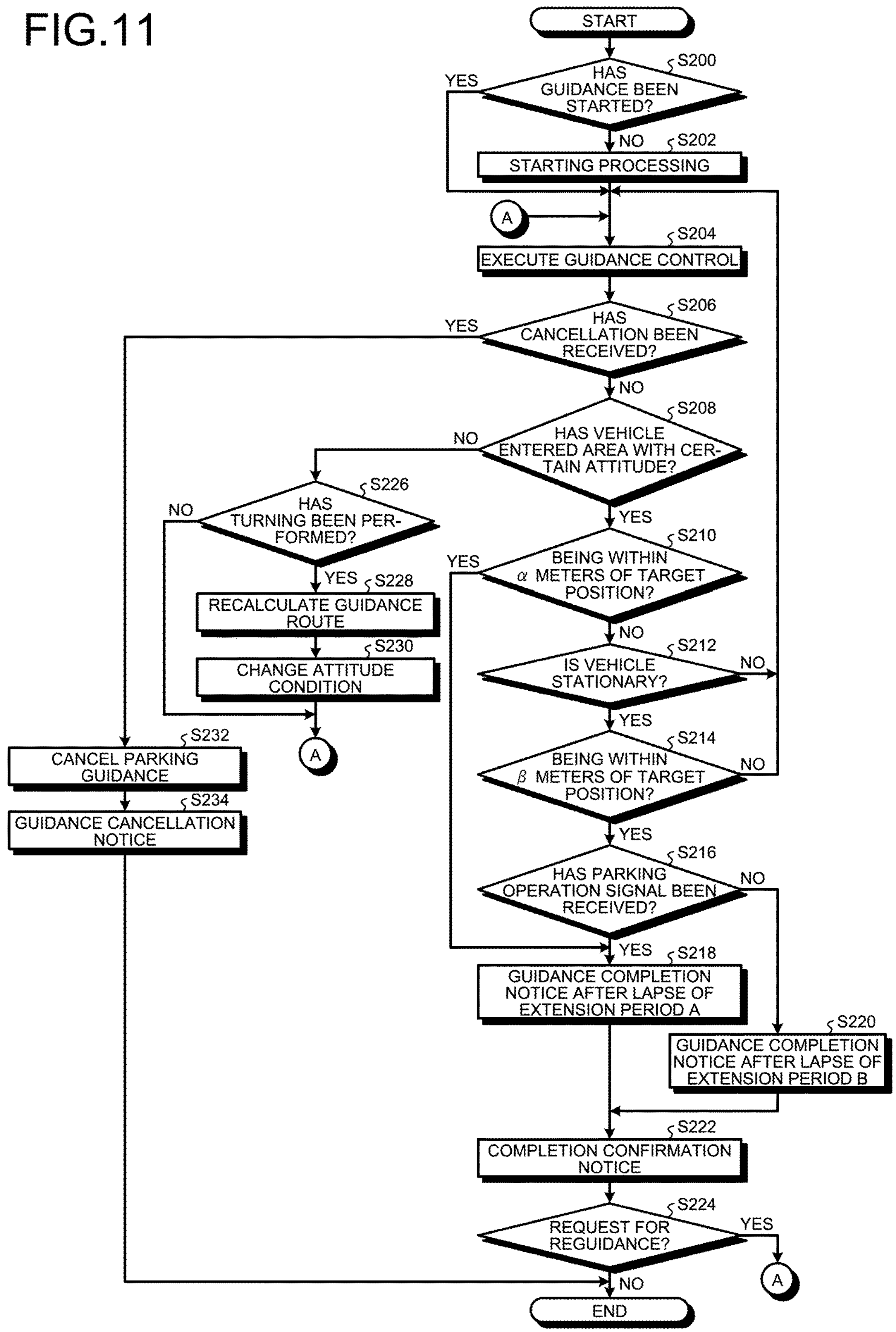
FIG. 11 is flowchart illustrating details of guidance control processing in FIG. 6.

FIG. 11 is a flowchart illustrating details of the guidance control processing at S108 in the flowchart in FIG. 6. First, the guidance control unit 40 of the CPU 14*a* checks whether the guidance control has been already started and, if the guidance control has not been started (No at S200), provides a message and the like about the start of the guidance from the sound output device 9 and the like via the output information determination unit 42, the sound control unit 14*e*, and the like, for example, as starting processing (S202). The guidance control unit 40 then performs the automatic steering by the steering system 13 and performs the guidance control by travel using creeping (S204). If the guidance control has been started at S200 (Yes at S200), the processing at S202 is skipped.

Figure 12:
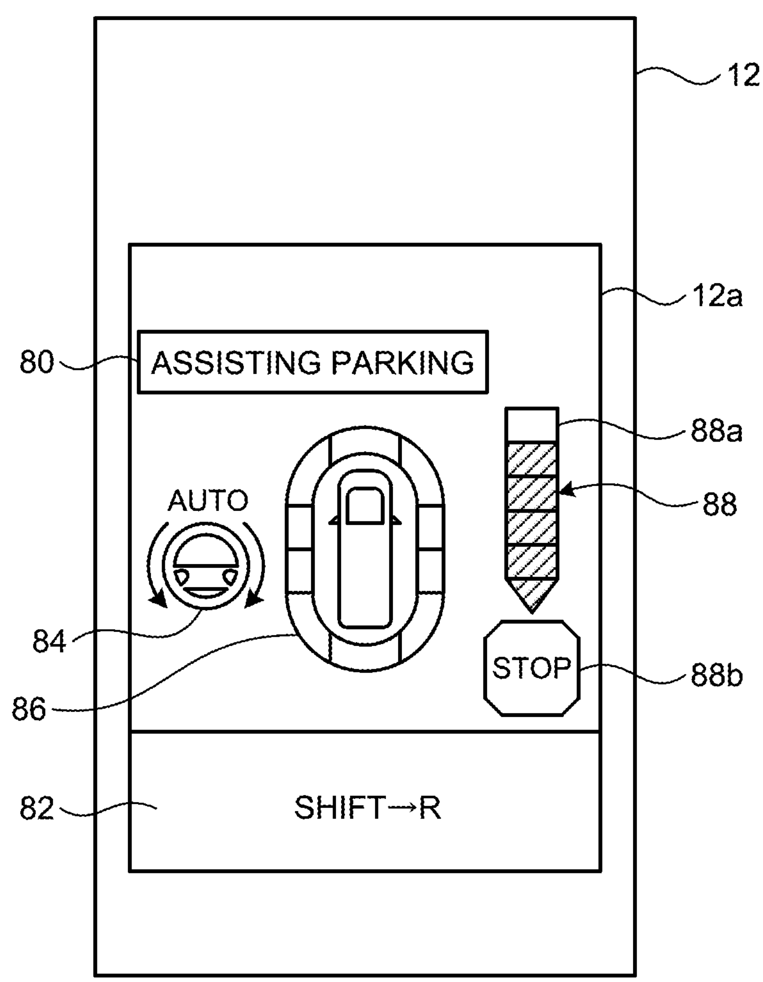
FIG. 12 is a diagram illustrating a display example during parking assistance as an example of a screen of a display device displaying guidance-related information in the parking assistance system according to the embodiment.

FIG. 12 illustrates an example of the screen 12*a* displayed on the display device 12 at the start of the performance or during the performance of the guidance control. The screen 12*a* includes a first display area 80 displaying a control status and operation instructions to the user during the parking assistance control and a second display area 82. During the parking assistance control, the first display area 80 displays "Parking assistance is working," for example. This display may be displayed in a flashing manner or in a highlighted color such as red in order to call attention to the user. The second display area 82 displays "Shift→R," for example, so as to indicate that guidance by reversing will be started and to prompt the user to operate the shift lever. In this case also, the display may be displayed in a flashing manner or in a highlighted color in order to call attention to the user. In addition, displayed are a steering symbol 84 indicating that the automatic steering control is being performed, a surroundings detection symbol 86 indicating whether any obstacle to be paid attention to is present around the subject vehicle 68, and a completion indicator 88 indicating an approximate period until the completion of the parking assistance. The steering symbol 84 is lighted so as to provide a notification of the performance of the automatic steering when the steering control by the guidance control unit 40 is being performed. The steering symbol 84 may be displayed in a rotation angle corresponding to an actual steering angle. The surroundings detection symbol 86 arranges individual symbols around a vehicle symbol and can be configured, when an obstacle is present within a warning distance set in advance based on the detection result of the detection unit 32, to light an individual symbol indicating its presence direction. The individual symbol may be displayed in "blue," for example, in a steady state and may be changed from "blue" to "red" when an obstacle to be warned is detected. The completion indicator 88 has an indicator 88*a* indicating a period until the completion of the guidance by increasing and decreasing the number of lighting of the individual blocks, each of which indicates a unit period, and a target symbol 88*b* indicating the completion of the guidance. The display contents of the screen 12*a* are examples, and the display item may be changed, or the display mode may be changed as needed.

Figure 13:
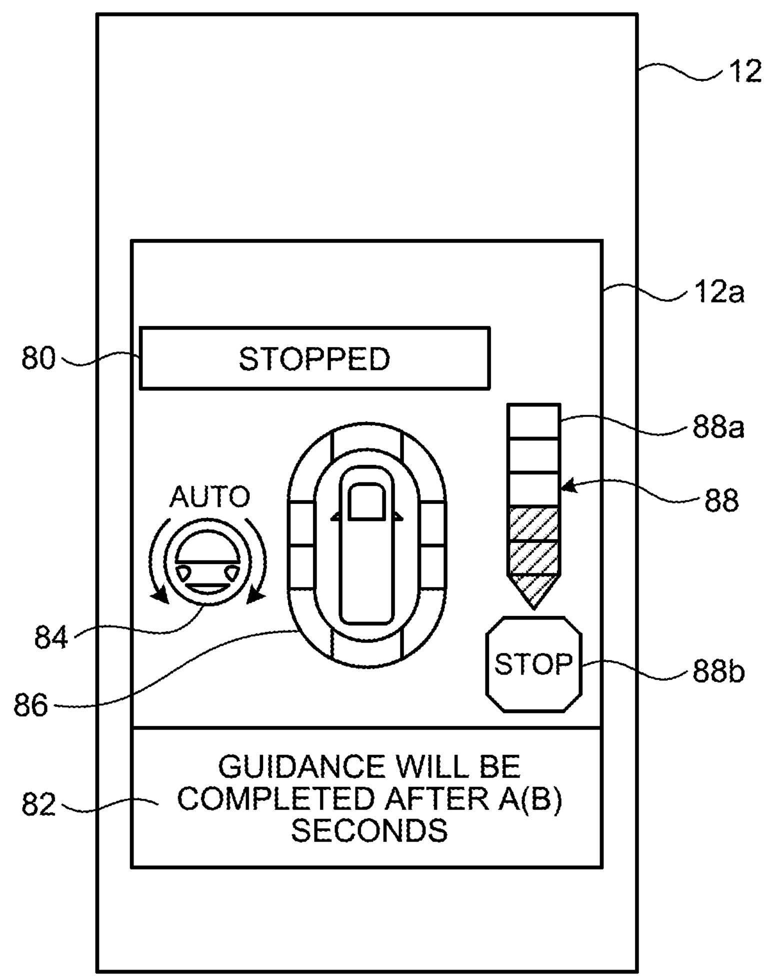
FIG. 13 is a diagram illustrating a display example when the vehicle has stopped during guidance as an example of the screen of the display device displaying the guidance-related information in the parking assistance system according to the embodiment.

Referring back to FIG. 11, when the guidance control is being performed, the guidance control unit 40 constantly monitors whether a cancellation operation that cancels the parking assistance by the user is input (S206). Whether an operation switch requesting guidance assistance is switched from "on" to "off" is monitored, for example. If the cancellation operation has not been received (No at S206), the guidance control unit 40 determines whether the subject vehicle 68 has entered the parkable area (the parking frame 76) with the certain attitude. This determination can be determined by checking the information provided from the imaging units 15 and the distance measuring units 16 and 17 and the movement status of the guidance reference point 72 relative to the parking guidance route L. If the subject vehicle 68 has entered the parking frame 76 with the certain attitude (Yes at S208), it is determined whether the subject vehicle 68 is within the first extension $\alpha$ such as $\alpha$=0.3 meter of the parking target position 78. If the subject vehicle 68 has not reached a position within the first extension $\alpha$ of the parking target position 78 (No at S210), the guidance control unit 40 determines whether the subject vehicle 68 is stationary. If the subject vehicle 68 is stationary (Yes at S212), it is determined whether the stop position is within the second extension $\beta$, which is closer to the travel road side than the first extension $\alpha$ based on the parking target position 78. If the stop position of the subject vehicle 68 is within the second extension $\beta$ such as $\beta$=1.0 meter (Yes at S214), the guidance control unit 40 determines whether a parking operation signal has been received. The parking operation signal is the operation input signal of the brake pedal, the operation input signal of the parking brake acquired via the brake sensor reception unit 44, or an operation input signal indicating that the position of the shift lever has moved to "P Position," for example. If any of these operation input signals has been received (Yes at S216), the guidance control unit 40 determines that the user has performed the operation to intentionally complete the parking assistance. The output information determination unit 42 outputs a signal to the display control unit 14*d* so as to display the screen 12*a* as illustrated in FIG. 13 based on the reception of the parking operation signal. In this case, the first display area 80 displays a message indicating the state of the subject vehicle 68 such as "Stopped," whereas the second display area 82 displays a guidance completion notice (an advanced message) indicating that the guidance will be completed saying "Guidance will be completed after A seconds" (S218).

In contrast, if the parking operation signal has not been received, although the subject vehicle 68 is stationary at S216 (No at S216), the guidance control unit 40 determines that the present vehicle stop is not a result of an intentional attempt to complete the parking assistance by the user. The output information determination unit 42 displays the guidance completion notice (the advanced message) indicating that the guidance will be completed after a while saying "Guidance will be completed after B seconds" on the second display area 82 out of the screen 12*a* illustrated in FIG. 13 (S220).

Figure 14:
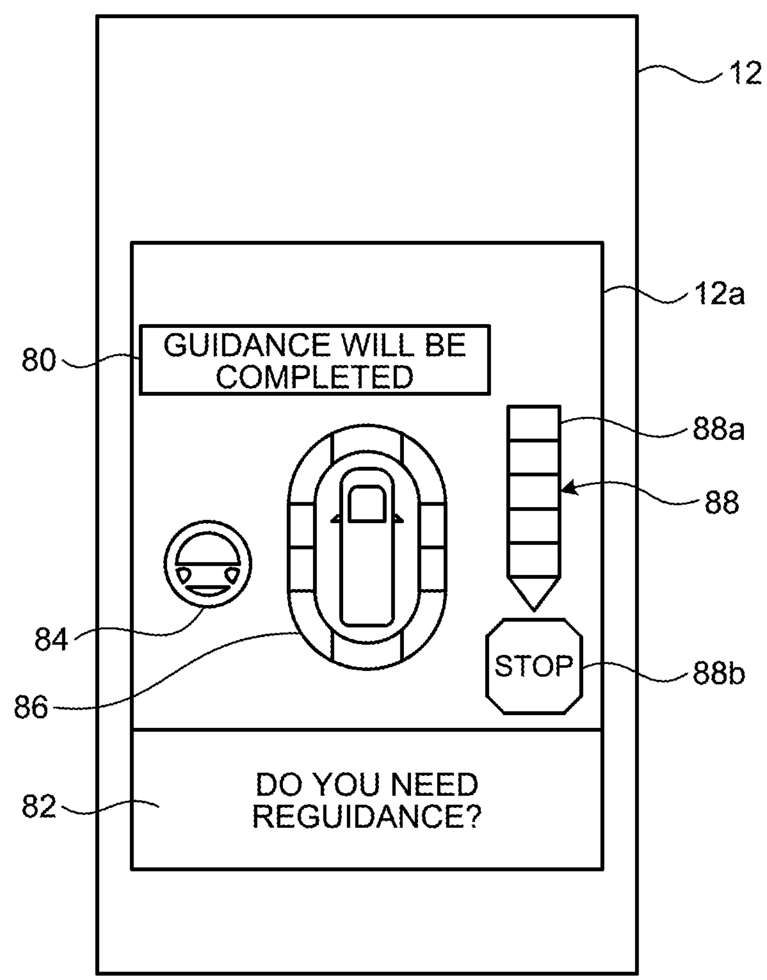
FIG. 14 is a diagram illustrating a display example when the completion of guidance is guided as an example of the screen of the display device displaying the guidance-related information in the parking assistance system according to the embodiment.

Following the guidance completion notice, the output information determination unit 42 displays a completion confirmation notice for confirming whether the parking assistance may be really completed by the present stop of the subject vehicle 68, that is, the appropriateness of the completion with the user on the screen 12*a* (S222). In this case, the output information determination unit 42 outputs a signal to the display control unit 14*d* so as to display the screen 12*a* as illustrated in FIG. 14, for example. In this case, the first display area 80 displays a message indicating the control state of the subject vehicle 68 such as "Guidance will be completed," whereas the second display area 82 displays a message that confirms a subsequent operation intention with the user saying "Do you need reguidance?" "Do you need reguidance?" displayed on the second display area 82 may be hidden after a lapse of a certain time such as 5 seconds. The display on the screen 12*a* is thus limited to "Guidance will be completed" on the first display area 80 alone, whereby the user is caused to easily recognize that the parking assistance will be completed clearly. Along with the hiding of "Do you need reguidance?" on the second display area 82, the display on the first display area 80 may be changed to "Guidance has been completed." In this case, the user is caused to easily recognize the completion of the parking assistance more clearly. When the processing at S218 has been passed, the display of the completion confirmation notice at S222 may be omitted. In other words, when the user has intentionally completed the parking assistance, the parking assistance processing may be completed without confirmation. In this case, the display at the time of the completion is simplified, and further, the user is easily given an impression that the processing has been quickly completed.

The guidance completion notice at S218 thus ends in a shorter first completion extension period such as 2 seconds, and the completion confirmation notice at S222 is provided to the user, whereby, after the intentional stop of the subject vehicle 68, the user can be caused to easily quickly recognize that the parking assistance has been completed. The guidance display about the completion of the parking assistance is thus displayed in a quick tempo in the shorter first completion extension period, whereby an impression that the parking assistance system 100 is smoothly reacting corresponding to the stop by the intension of the user is easily given, making it difficult to cause the user's uncomfortableness at the time of the end of control. In contrast, the guidance completion notice at S220 ends in a second completion extension period longer than the first completion extension period such as 5 seconds, and the completion confirmation notice at S222 is provided, whereby, after the unintentional stop of the subject vehicle 68, a margin for considering a next operation can be provided to the user. Pressing down the accelerator resolves the stop caused by a slope or the like and advances to S204 to enable the guidance control to be continued, for example. Consequently, even when the parking assistance is attempted to be completed contrary to the intension of the user, the completion of the parking assistance is avoided to be easily guided to the continuation of the parking assistance and other operations, making it difficult to cause the user's uncomfortableness that the parking assistance is completed while the user is not aware of it.

If the request for reguidance is not performed by the user in the completion confirmation notice at S222 (No at S224), the guidance control unit 40 and the output information determination unit 42 complete the parking assistance as it is and end this flow. In contrast, if the request for reguidance is performed by the user in the completion confirmation notice at S222 (Yes at S224), the process returns to S204, and the guidance control unit 40 and the output information determination unit 42 continue the parking assistance processing. In this case, it is considered that the subject vehicle 68 has stopped owing to the balance between the driving force by creeping and the gradient of the parking lot 60, for example, and the guidance control unit 40 may temporarily increase torque during creeping by a certain amount, for example.

If the stop position of the subject vehicle 68 is not within the second extension β such as β=1.0 meter at S214 (No at S214), the process returns to S204. In this case, it can be determined that although having entered the parking frame 76 with the certain attitude, the subject vehicle 68 has not entered a position that can be regarded as parking. In such a case, the process returns to S204 to perform the subsequent processing to continue the guidance. Also when the stop of the subject vehicle 68 is not recognized at S212, the process returns to S204 to perform the subsequent processing to continue the guidance. If the subject vehicle 68 has reached a position within the first extension α such as α=0.3 meter of the parking target position 78 at S210 (Yes at S210), the pieces of processing at S212 to S216 are skipped to perform the processing at S218. In other words, processing similar to that when the user performs parking operation is performed to quickly complete the parking assistance. In this case, instead of the display saying "Guidance will be completed after A seconds" on the second display area 82 in FIG. 13, "Guidance has been completed" may be displayed, and further, the pieces of processing at S222 and S224 may be omitted. In this case, when the guidance by the parking assistance has been completed as scheduled, a completion notice can be immediately performed, and the parking assistance can be ended more simply and quickly. If "Yes" in the processing at S210, the process advances to the processing at S218 regardless of whether the subject vehicle 68 is stationary; the stop of the subject vehicle 68 may be left to the operation of the brake pedal by the user, or the subject vehicle 68 may be automatically braked.

Figure 15:
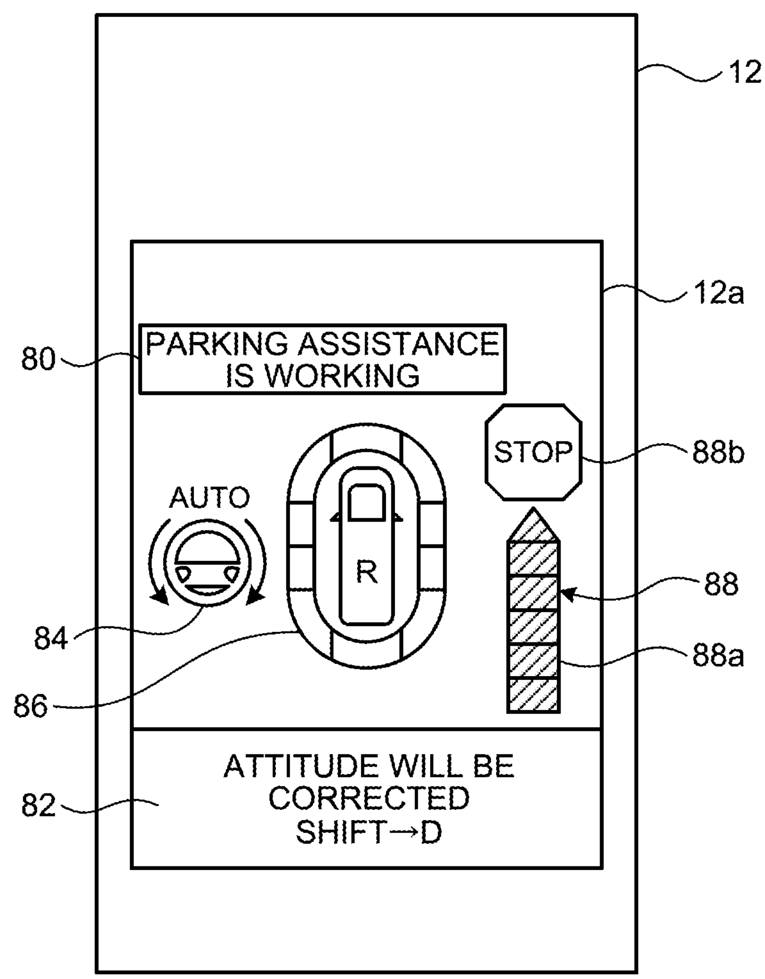
FIG. 15 is a diagram illustrating a display example when a parking guidance route has been recalculated and the parking assistance has been resumed as an example of the screen of the display device displaying the guidance-related information in the parking assistance system according to the embodiment.

If it is determined that the subject vehicle 68 has not entered the parkable area (the parking frame 76) with the certain attitude at S208 (No at S208), the guidance control unit 40 determines whether turning along the parking guidance route L for the subject vehicle 68 to enter the parking frame 76 has been performed by the steering control. If the turning has not been performed (No at S226), it is determined that the subject vehicle 68 has not yet entered the parking frame 76, that is, is still present on the travel road of the parking lot 60, and the process returns to S204 to perform the subsequent processing to continue the guidance. In contrast, if the turning along the parking guidance route L for the subject vehicle 68 to enter the parking frame 76 has been already performed by the steering control (Yes at S226), the guidance control unit 40 determines that the subject vehicle 68 has entered the parkable area (the parking frame 76) while inclining or while deviating. Consequently, the guidance control unit 40 causes the route calculation unit 38 to perform the recalculation of the parking guidance route (S228), that is, attitude correction processing including turning. When the attitude correction processing is performed, the output information determination unit 42 outputs a signal to the display control unit 14*d* so as to display the screen 12*a* as illustrated in FIG. 15, for example. In this case, the first display area 80 displays a message saying "Supporting parking," for example, to give notice of the fact that the control state of the subject vehicle 68 is continuing a parking assistance state. The second display area 82 displays a message indicating that a shift change is required to perform attitude correction saying "Attitude will be corrected. Shift→D." To perform guidance via the parking guidance route including the recalculated additional routes L2 and L3, the subject vehicle 68 will be temporarily switched to advancing. For this purpose, the completion indicator 88 temporarily reverses the indicator 88*a* and the target symbol 88*b* in position as in FIG. 15, and the display is changed so as to cause the user to easily understand a direction in which the subject vehicle 68 will travel.

When the recalculation of the parking guidance route is performed, the attitude condition about the vehicle attitude from when the subject vehicle 68 entered the parking frame 76 to when the subject vehicle 68 reaches the second completion area (the second extension β) is changed as described above (S230), and adjustment of parking accuracy and an assistance time by the recalculation of the parking guidance route L is performed. The process then returns to S204 to perform the subsequent processing to continue the guidance.

If the parking assistance is canceled by the user at S206 (Yes at S206), the guidance control unit 40 cancels the guidance for parking (S232). The output information determination unit 42 displays a guidance cancellation notice indicating that the guidance has been canceled midway therethrough using the first display area 80 and the second display area 82 of the screen 12*a*. Display such as "Parking assistance has been canceled. Drive carefully." is performed (S234), for example, and this flow once ends to prepare for the next request for the start of parking assistance.

Although an example in which the attitude condition is changed corresponding to the recalculation of the parking guidance route at S230 has been presented, the change details of the attitude condition may be determined by the length of the additional route L2 of the recalculated parking guidance route. If the length of the additional route L2 is smaller than a certain value, for example, the tolerance values (the attitude condition) of the inclination angle and the deviation amount indicating the attitude of the subject vehicle 68 are corrected to the looser side. When the opening width of the parkable area (the parking frame 76) or the travel road width of the parking lot 60 is narrow, for example, an advancing distance for turning may be limited to be short. Similarly, also when an obstacle is present around the subject vehicle 68, the advancing distance for turning may be limited to be short. In such cases, large attitude correction may be difficult by turning. In such a case, the tolerance values of the inclination angle and the deviation amount are corrected to the looser side, thereby enabling control so as to prioritize a reduction in a parking completion time. In contrast, if the length of the additional route L2 is the certain value or larger, the tolerance values (the attitude condition) of the inclination angle and the deviation amount indicating the attitude of the subject vehicle 68 are corrected to the stricter side. In other words, the advancing distance for turning can be sufficiently endured, and large attitude correction is enabled by turning. In such a case, the tolerance values of the inclination angle and the deviation amount are corrected to the stricter side, thereby enabling control so as to prioritize the parking position accuracy at the time of the completion of parking such as guiding the subject vehicle 68 straight relative to the parking frame 76.

The initial values of the tolerance values (the attitude condition) of the inclination angle and the deviation amount indicating the attitude of the subject vehicle 68 may be determined based on whether a turning operation that changes the orientation of the subject vehicle 68 was accompanied at an early stage of the parking assistance. When the parking assistance is performed, if the travel road width is sufficient, for example, assisting the subject vehicle 68 starting from an advancing stage, the subject vehicle 68 may be turned in a direction departing from the parkable area (the parking frame 76) to take a vehicle attitude that is easy to enter the parkable area and then to be reversed. When such a parking guidance route L that accompanies the turning at the early stage has been calculated, the guidance is easy, and therefore the initial values of the attitude condition may be made stricter to prioritize parking position accuracy at the time of the completion of parking. In contrast, if the travel road width is not sufficient, for example, the turning at the early stage of the guidance as described above may not be able to be performed. In such a case, the subject vehicle 68 will start to reverse from an attitude substantially perpendicular to the parkable area (the parking frame 76) to be guided to the parking frame 76. Such a case may be complicated guidance including turning or the like, and the initial values of the attitude condition may be loosened to reduce the occurrence of the recalculation of the parking guidance route and to prioritize a reduction in the parking completion time.

As illustrated in FIG. 7 and the like, when the parking lot 60 is clearly divided by the division lines 62, it can be expected that the detection by the detection unit 32, the determination of the parking target position 78 by the target position determination unit 36, and the calculation of the parking guidance route L by the route calculation unit 38 can be performed with higher precision than in a case in which there is no division line 62. Given these circumstances, in the parking lot 60 in which the division lines 62 can be recognized, the initial values of the attitude condition may be set more strictly than in a case in which no division line 62 can be recognized. Thus, the initial values of the attitude condition are determined based on whether the division lines 62 are recognized, whereby either the control prioritizing the parking accuracy or the control prioritizing the reduction in the parking completion time is used to enable optimum parking assistance depending on the situation.

When the subject vehicle 68 is guided in accordance with the parking assistance, even when the driving force by creeping is constant, the speed of the subject vehicle 68 may change depending on the road surface condition of the parking lot 60. If the speed of the subject vehicle 68 during the guidance is high, the deviation of the actual travel trajectory of the subject vehicle 68 relative to the calculated parking guidance route L may be large. Given this situation, the initial values of the tolerance values (the attitude condition) of the inclination angle and the deviation amount indicating the attitude of the subject vehicle 68 may be determined in accordance with the speed of the subject vehicle 68 during the guidance. If the speed of the subject vehicle 68 during the guidance is lower than a certain speed, for example, it can be expected that the guidance accuracy of the subject vehicle 68 relative to the parking guidance route L be sufficiently ensured, and the initial values of the attitude condition may be set more strictly than in a case in which the speed of the subject vehicle 68 is the certain speed or higher. In contrast, if the speed of the subject vehicle 68 during the guidance is the certain speed or higher, the guidance accuracy of the subject vehicle 68 relative to the parking guidance route L may reduce, and the initial values of the attitude condition may be set more loosely than in the case in which the speed of the subject vehicle 68 is lower than the certain speed. Thus, the initial values of the attitude condition are determined in accordance with the speed of the subject vehicle 68 during the guidance, whereby either the control prioritizing the parking accuracy or the control prioritizing the reduction in the parking completion time is used to enable optimum parking assistance depending on the situation.

The initial values of the tolerance values (the attitude condition) of the inclination angle and the deviation amount indicating the attitude of the subject vehicle 68 may be determined in accordance with the riding position of an occupant riding in the subject vehicle 68. If no occupant is riding in the passenger seat side, for example, it can be regarded that no occupant gets in and out of the vehicle to and from the passenger seat side, and inconvenience is unlikely to occur even when the subject vehicle 68 has been parked somewhat deviating toward the passenger sheet side. For this reason, if there is no occupant on the passenger seat side, the initial values of the attitude condition may be set more loosely than in a case in which an occupant is present on the passenger seat side. If the occupant is present on the passenger seat side, the initial values of the attitude condition may be set more strictly than in the case in which no occupant is on the passenger seat side. The presence or absence of the occupant can be detected by arranging a pressure sensor on each seat or arranging an opening-and-closing sensor detecting the presence or absence of the opening and closing of a door, for example. When there is an imaging unit imaging the inside of the cabin 2*a*, the presence or absence of the occupant may be detected based on its imaging result. Thus, the initial values of the attitude condition are determined in accordance with the riding condition of the subject vehicle 68, whereby either the control prioritizing the parking accuracy or the control prioritizing the reduction in the parking completion time is used to enable optimum parking assistance depending on the situation.

Although an example in which the completion extension period is prolonged when the parking operation signal has not been received at S216 in FIG. 11 has been described in the present embodiment, when the subject vehicle 68 has stopped, if the accelerator pedal has been pushed down, the completion extension period may be prolonged regardless of the presence or absence of the pushing down of the brake pedal. Even when the subject vehicle 68 has stopped by the operation of the brake pedal, for example, it can be regarded that the continuation of the guidance is requested by the user by the operation of the accelerator pedal, thereby enabling control corresponding to the request by the user.

The embodiment has described an example in which the reference line 74 that connects the travel road side front-ends of the right and left adjacent parked vehicles 64 is set, and the parking frame 76 is determined so as to cause the travel road side front-end of the subject vehicle 68 to substantially match the reference line 74. Another embodiment may set the reference line 74 that connects the front-ends of the division lines 62 and determine the parking frame 76 considering the length in the fore-and-aft direction of the vehicle based on the reference line 74 and an offset distance in the reversing direction from the front-ends of the division lines 62 when the subject vehicle 68 is actually parked. The division lines 62 are generally set to the extent that a large-sized vehicle is accommodated, and the parking frame 76 is determined based on the division lines 62 as described above, whereby smooth parking assistance can be achieved. However, the division lines 62 may change recognition accuracy in the imaging units 15 depending on deterioration or weather, and whether the reference line 74 is set based on the adjacent parked vehicles 64 or the reference line 74 is set based on the division lines 62 may be able to be selected in accordance with the parking lot 60 or an ambient environment on each occasion. When either of them is selected, the parking assistance system 100 may automatically select either of them based on the parking lot 60 or the ambient environment on each occasion, or the user may be able to select either of them.

The embodiment has described an example in which the completion extension period is selected based on whether the parking operation signal has been received at S216 when the subject vehicle 68 has stopped in the flowchart in FIG. 11. Another embodiment may select the completion extension period based on the position of the front-ends of the division lines 62 and the position of the subject vehicle 68 (the position of the guidance reference point 72, for example). In a situation in which the front-end of the division line 62 has not been imaged by the imaging unit 15*c* arranged at the end 2*c* on the front side of the subject vehicle 68, for example, it can be regarded that the subject vehicle 68 has not yet sufficiently entered the space defined by the division lines 62 and has not come into contact with the wheel stops 66. In other words, it can be regarded that in this state the subject vehicle 68 has stopped not by operation of the brake pedal or the like but for another reason, because of the balance between the gradient and the driving force or the like. Consequently, if the subject vehicle 68 has stopped with the front-end of the division line 62 not recognized, the guidance control unit 40 and the output information determination unit 42 may select the processing at S220 not based on the parking operation signal. In contrast, if the subject vehicle 68 has stopped in a situation in which the front-end of the division line 62 has been imaged by the imaging unit 15*c*, it can be regarded that the subject vehicle 68 has come into contact with the wheel stops 66. In this case, the guidance control unit 40 and the output information determination unit 42 may select the processing at S218 not based on the parking operation signal. Thus, the control of the present embodiment can be performed also based on the subject vehicle 68 and the ambient environment, which can contribute to improvement in the degree of flexibility in design.

The embodiment has described an example in which the completion extension period is selected based on whether the parking operation signal has been received at S216 when the subject vehicle 68 has stopped in the flowchart in FIG. 11. Another embodiment may select the completion extension period based on the operation state of the brake pedal even when the parking operation signal has been received. Even after the subject vehicle 68 has entered the second extension during the parking assistance, for example, the brake pedal may be operated by shallow (weak) push down for speed adjustment. In such a case, it can be regarded that the intension of parking is weak even when the parking operation signal has been received. Consequently, S220 in the flowchart in FIG. 11 may be selected. In contrast, if the brake pedal has been operated by deep (strong) push down, it can be regarded that the intension of parking is strong. Consequently, S218 in the flowchart in FIG. 11 may be selected. In this case, regarding as a clear expression of intention to stop, the completion extension period may be further reduced to 1 second, for example. Thus, the operation mode of the brake pedal is regarded as a parameter of determination, whereby detailed control with the intention of the user reflected in more detail can be performed. The completion extension period may be selected in accordance with the length of the push-down time of the brake pedal. If the push-down time of the brake pedal is shorter than a certain time, for example, regarding as an operation for speed adjustment, it can be regarded that the intension of parking is weak even when the parking operation signal has been received. Consequently, S220 in the flowchart in FIG. 11 may be selected. In contrast, if the push-down time of the brake pedal is the certain time or longer, it can be regarded that the intension of parking is strong. Consequently, S218 in the flowchart in FIG. 11 may be selected. In this case too, detailed control with the intension of the user reflected is enabled.

The subject vehicle 68 completely fitting into the parking frame 76 set to determine the parking target position 78 may be a condition to complete the parking assistance. As described above, when the parking assistance is attempted to be completed when the subject vehicle 68 has entered the second extension β and has stopped, the above condition is not necessarily satisfied. In such a case, the set parking frame 76 may be expanded in a vehicle travel direction in the pieces of processing at S218 and S220 in the flowchart in FIG. 11. The parking frame 76 is expanded by β=1.0 meter corresponding to the second extension β, for example, whereby the subject vehicle 68 fits into the expanded parking frame, thereby satisfying the above completion condition. Consequently, contribution to improvement in the design variation of control can be made.

The embodiment has described an example in which, as the parking assistance, the guidance control unit 40 automatically performs the steering control corresponding to the parking guidance route L and guides the subject vehicle 68 to the parking target position 78 while causing it to travel by the driving force by creeping. Another embodiment includes, as an aspect of the parking assistance device, a parking assistance device that performs the guidance along the calculated parking guidance route by guidance by display or voice alone and does not perform automatic steering control and the like, for example. In other words, the embodiment can be applied to a parking assistance device of a type that provides the user with a steering direction, a steering amount, the operation amount and operation timing of the accelerator pedal and the brake pedal, and the like by means of display or sound, and allows the user to perform actual travel operations, in which similar effects can be obtained.

A parking assistance program to be executed by the guidance control unit 40 or the output information determination unit 42 according to the present embodiment may be recorded and provided in a computer-readable recording medium such as a compact disc read only memory (CD-ROM), a flexible disk (FD), a compact disc recordable (CD-R), and a digital versatile disc (DVD), as an installable or executable file.

Further, the parking assistance program to be executed by the guidance control unit 40 or the output information determination unit 42 according to the present embodiment may be stored in a computer connected to a network such as the Internet and provided by being downloaded via the network. The parking assistance program to be executed by the guidance control unit 40 or the output information determination unit 42 according to the present embodiment may be provided or distributed via a network such as the Internet.

Although the present embodiment illustrates an example in which the notices for the parking assistance are performed by the screen 12*a* displayed on the display device 12, another embodiment may perform notices with similar contents by voice using the sound output device 9. Parking assistance that performs information provision by the screen 12*a* and information provision by voice in combination and is understood by the user more easily can be provided.

Although some embodiments and modifications of the present invention have been described, these embodiments and modifications are presented by way of example and are not intended to limit the scope of the invention. These novel embodiments can be achieved in various other forms, and various omissions, substitutions, and modifications can be made without departing from the gist of the invention. These embodiments and modifications thereof are included in the scope and the gist of the invention and are also included in the invention described in the claims and the equivalents thereof.

EXPLANATIONS OF LETTERS OR NUMERALS

1 Vehicle
4 Steering unit
11 Monitor device
12 Display device
12*a* Screen
14 ECU
14*a* CPU
32 Detection unit
34 Operation reception unit
36 Target position determination unit
38 Route calculation unit
40 Guidance control unit
42 Output information determination unit
44 Brake sensor reception unit
46 Accelerator sensor reception unit
46 Shift sensor reception unit
50 Steering angle sensor reception unit
52 Wheel speed sensor reception unit
60 Parking lot
62 Division line
64 Adjacent parked vehicle
66 Wheel stop
68 Subject vehicle
72 Guidance reference point
74 Reference line
76 Parking frame
78 Parking target position
80 First display area
L Parking guidance route
82 Second display area
100 Parking assistance system

The invention claimed is:

1. A parking assistance device comprising:

a detection unit that detects a parkable area in a surrounding area of a vehicle;

a route calculation unit that calculates a parking guidance route for guiding the vehicle from a current position of the vehicle to a parking target position contained in the parkable area detected by the detection unit; and a control unit that guides the vehicle to the parking target position according to the parking guidance route calculated by the route calculation unit, completes the guidance when the vehicle has fit into the parkable area with a certain attitude and has reached the parking target position, and completes the guidance of the vehicle according to a stop mode of the vehicle when the vehicle has entered the parkable area with the certain attitude and the vehicle has stopped before reaching the parking target position, wherein the control unit varies a completion extension period according to the stop mode of the vehicle, the completion extension period being a period from when the vehicle has stopped to when output of the guidance of the vehicle is completed during which the vehicle keeps stopping, the stop mode indicating a presence or absence of an operation by a user for stopping the vehicle.

2. The parking assistance device of claim 1, wherein the control unit sets a length of the completion extension period to be longer for a second stop mode in which the stop mode of the vehicle does not involve an operation for stopping the vehicle than for a first stop mode in which the stop mode of the vehicle involves the operation for stopping the vehicle.

3. The parking assistance device of claim 1, wherein when completing the guidance of the vehicle, the control unit performs a confirmation notice that confirms appropriateness of completion with the user.

4. The parking assistance device of claim 1, wherein when the control unit determines that the certain attitude is not satisfied when the vehicle has entered the parkable area by a certain amount, the control unit reserves the completion of guidance by the stop of the vehicle, and causes the route calculation unit to recalculate a parking guidance route so as to correct a deviation of guidance, and wherein the control unit determines that the certain altitude is not satisfied when at least one of the following conditions is met: the vehicle has deviated from the parking guidance route by a certain distance or more in a vehicle width direction, and when a central axis in a fore-and-aft direction of the vehicle has deviated by a certain angle or more relative to a guidance direction based on the parking guidance route.

5. The parking assistance device of claim 4, wherein the control unit corrects, when the route calculation unit has performed the recalculation of the parking guidance route, tolerance values of a deviation of a distance in the vehicle width direction of the vehicle relative to the recalculated parking guidance route and a deviation of the central axis in the fore-and-aft direction of the vehicle relative to the guidance direction.

* * * * *